(12) United States Patent
Sato

(10) Patent No.: US 7,729,354 B2
(45) Date of Patent: Jun. 1, 2010

(54) NODE AND CONTROL METHOD THEREOF

(75) Inventor: Masahiro Sato, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 176 days.

(21) Appl. No.: 12/010,880

(22) Filed: Jan. 30, 2008

(65) Prior Publication Data
US 2009/0034538 A1 Feb. 5, 2009

(30) Foreign Application Priority Data
Jan. 30, 2007 (JP) ............................. 2007-020072

(51) Int. Cl.
*H04L 12/28* (2006.01)
(52) U.S. Cl. ...................................... 370/392
(58) Field of Classification Search ........................ None
See application file for complete search history.

(56) References Cited

U.S. PATENT DOCUMENTS 7,529,240 B2 * 5/2009 Sawada et al. .............. 370/390

2001/0048687 A1 * 12/2001 Coden ......................... 370/403
2003/0225916 A1 * 12/2003 Cheon et al. ................. 709/251
2004/0170184 A1     9/2004 Hashimoto
2006/0056425 A1     3/2006 Wu et al.
2007/0064700 A1 *  3/2007 Holness ....................... 370/392

FOREIGN PATENT DOCUMENTS

JP      2004-242194     8/2004
JP      2006-87107      3/2006

* cited by examiner

*Primary Examiner*—Chirag G Shah
*Assistant Examiner*—Amarnauth Persaud
(74) *Attorney, Agent, or Firm*—Staas & Halsey LLP

(57) ABSTRACT

According to an aspect of the embodiments, a node arranged on a ring network, for transmitting a frame from upstream to downstream, the ring network having a plurality of nodes capable of connecting a network apparatus, respectively, the node comprises: a detector for detecting the frame on the ring network; and a frame controller for distinguishing the detected frame whether the frame reaches a final destination, the frame controller stopping the transmitting for the frame when the ring network is lacked of ability to reach the frame to the destination.

5 Claims, 25 Drawing Sheets

| NODE | HOP COUNT | Ringlet |
|------|-----------|---------|
| 1 | 5 | 0 |
| 2 | 4 | 0 |
| 3 | 3 | 0 |
| 4 | 2 | 0 |
| 5 | 1 | 0 |
| 1 | 1 | 1 |
| 2 | 2 | 1 |
| 3 | 3 | 1 |
| 4 | 4 | 1 |
| 5 | 5 | 1 |

206

| NODE | da |
|------|----|
| 1 | A |
| 2 | B |
| 4 | C |

NODE AND CONTROL METHOD THEREOF

BACKGROUND OF THE INVENTION

1. Field of the Invention

This technology is applied to a node provided on a ring network.

Among technologies for transmitting data on a ring network that focus on a failure-recovery function is Resilient Packet Ring (RPR). The RPR is a standard set by the Institute of Electrical and Electronics Engineers (IEEE) 802.17 Working Group. RPR is a technology relating to a node on a two-way network using a dual ring network.

Specifically, RPR has the following features.

(a) High-Speed Failure Recovery (failure-recovery ability of 50 msec or less, which is approximately the same level as that of Synchronous Optical Network/Synchronous Digital Hierarchy (SONET/SDH).

(b) Effective Use of Band (effective use of a band thanks to "spatial reuse")

A token is used as an access control system in a data link such as Fiber-Distributed Data Interface (FDDI) and Token Ring, so only a node that holds the token is able to transmit data. On the other hand, spatial reuse allows data transmission at any time if the link band is available.

(c) Fairness Function (securing of band fairness using a fairness algorithm)

An available band between nodes on an RPR ring is fairly controlled when congestion occurs. Quality of Service (QoS) is provided using data transfer control that is matched with three priority classes.

(d) Topology Discovery Function (recognizing the initial state of the ring topology/detecting a variation)

Information (topology database) on a route on the ring network is exchanged between nodes using a control frame.

(e) Support for Layer 2 Media Access Control (MAC)

RPR corresponds to the MAC sublayer of Layer 2 and uses the MAC technology of Layer 2 to realize a band-sharing ring topology. While the MAC function of RPR is different from that of Ethernet (registered trademark), both can use the same MAC address.

(f) Use of Existing Technologies for Layer 1 (use of SONET/SDH, Giga bit Ethernet (GbE; registered trademark), 10 GbE)

Data transfer system that is not dependent on a physical layer system is realized.

When IEEE 802.17-based nodes each having the above-mentioned features communicate with devices (hereinafter referred to as "remote nodes") subordinate thereto, they always perform flooding all over the RPR ring because they do not have information on the route to the destination remote node. Thus, effective use of the transmission band (spatial reuse) has not been done.

2. Description of the Related Art

Disclosed as a related art using the standard IEEE 802.17 is Laid-open Japanese Patent Application Number No. 2004-242194.

According to the above-mentioned related art example, IEEE 802.17b is a revision of IEEE 802.17 for the purpose of solving the above-mentioned problem. IEEE 802.17b is provided with Spatially Aware Sublayer (SAS) that a technology for transmitting a packet to only a part of the ring rather than to all over the ring, so as to save the band. SAS is a standard for bridging the layer 2 to realize spatial reuse of the ring band. Thus, IEEE 802.17b requires that nodes each have a route table regarding subordinate nodes thereof, that is, remote nodes. This enables each node to perform a unicast communication even with a remote node, thereby enabling effective use of the transmission band (spatial reuse).

Incidentally, if an IEEE 802.17b-based node(s) may be added to a ring network including IEEE 802.17-based nodes or if an IEEE 802.17-based node(s) is updated to an IEEE 802.17b-based node(s), an IEEE 802.17-based node(s) and an IEEE 802.17b-based node(s) may be mixed on the ring network. If remote nodes subordinate to IEEE 802.17-based nodes communicate with one another in such a mixed configuration, flooding is performed, resulting in a problem of consuming the band unnecessarily.

SUMMARY OF THE INVENTION

According to an aspect of the embodiments, a node arranged on a ring network, for transmitting a frame from upstream to downstream, the ring network having a plurality of nodes capable of connecting a network apparatus, respectively, the node comprises: a detector for detecting the frame on the ring network; and a frame controller for distinguishing the detected frame whether the frame reaches a final destination, the frame controller stopping the transmitting for the frame when the ring network is lacked of ability to reach the frame to the destination.

BRIEF DESCRIPTION OF THE DRAWINGS

FIG. 3 is a diagram showing a network configuration table and a remote node route table included in a node 6;

DETAILED DESCRIPTION OF THE PREFERRED EMBODIMENTS

An advantage of this embodiment is to provide a device that enables effective use of the transmission band (spatial reuse) even if there is a node using a different data transfer system on a ring network.

The embodiment adopts the following configurations to attain the above-mentioned advantage.

The embodiment will now be described with reference to the accompanying drawings. The configuration of this embodiment is only illustrative and the embodiment is not limited thereto.

Figure 1:
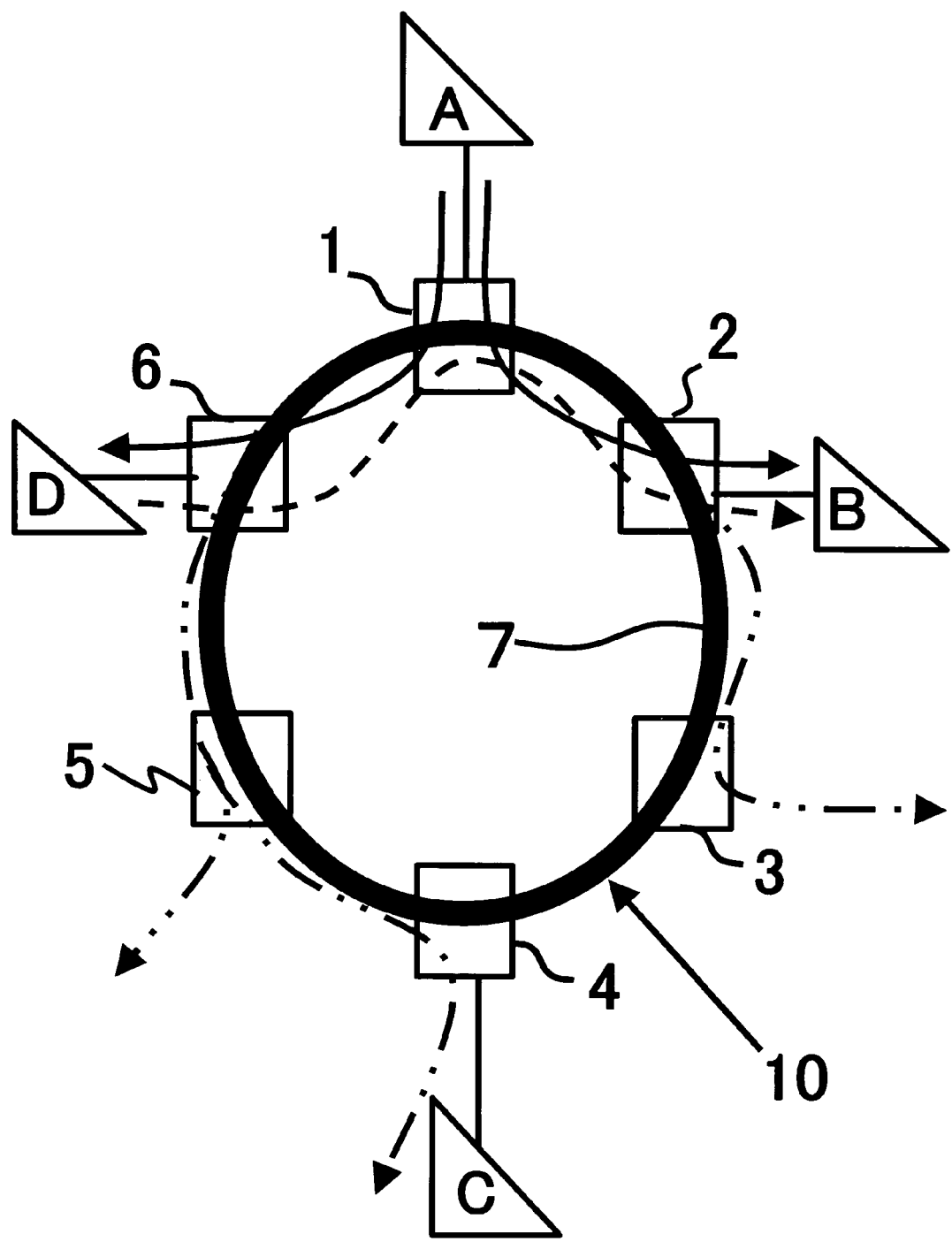
FIG. 1 shows the configuration of a ring network to which the embodiment is applied.

FIG. 1 shows the configuration of a ring network to which the embodiment is applied. In FIG. 1, nodes 1 to 6 are nodes that are able to perform RPR-based operations, and are included in a ring network 7. The ring serving as the transmission route of the ring network is of a dual type (not shown). An IEEE 802.17-based ring network is required to be of a dual type. However, the embodiment is applicable not only to a dual ring network but also to a one-ring network.

In FIG. 1, the nodes 1, 3, 4, and 5 are IEEE 802.17-based nodes; nodes 2 and 6 are IEEE 802.17b-based nodes. Connected to the nodes 1, 2, 4, and 6 are devices (hereinafter referred to as "remote modes") A to D, respectively, for processing information via an Ethernet (registered trademark). The nodes 1 to 6 are disposed on the ring network in the order of reference numerals thereof. A reference numeral 10 represents a boundary of the network. The network boundary is provided between nodes located in the middle of the network when seen from a node that is the source address of a frame. The reason for providing such a boundary is to use a ring having an opposite transmission direction to transmit the frame to a node located ahead of the network boundary, thereby effectively using the band of the network. The position of the network boundary may be set up arbitrarily for each node.

IEEE 802.17-Based Nodes

The IEEE 802.17-based nodes 1, 3, 4, and 5 each have a database. Specifically, the nodes 1, 3, 4, and 5 each have a network configuration table 202 (topology database) for indicating the relations between nodes other than itself on the ring network 7 and hop counts required for reaching such other nodes. The network configuration table 200 includes the MAC addresses of other nodes, the hop counts indicating the ordinal positions of other nodes relative to each node, and the transmission direction on the ring network. By way of example, the network configuration table 200 for the node 1 is shown in FIG. 2.

Figure 2:
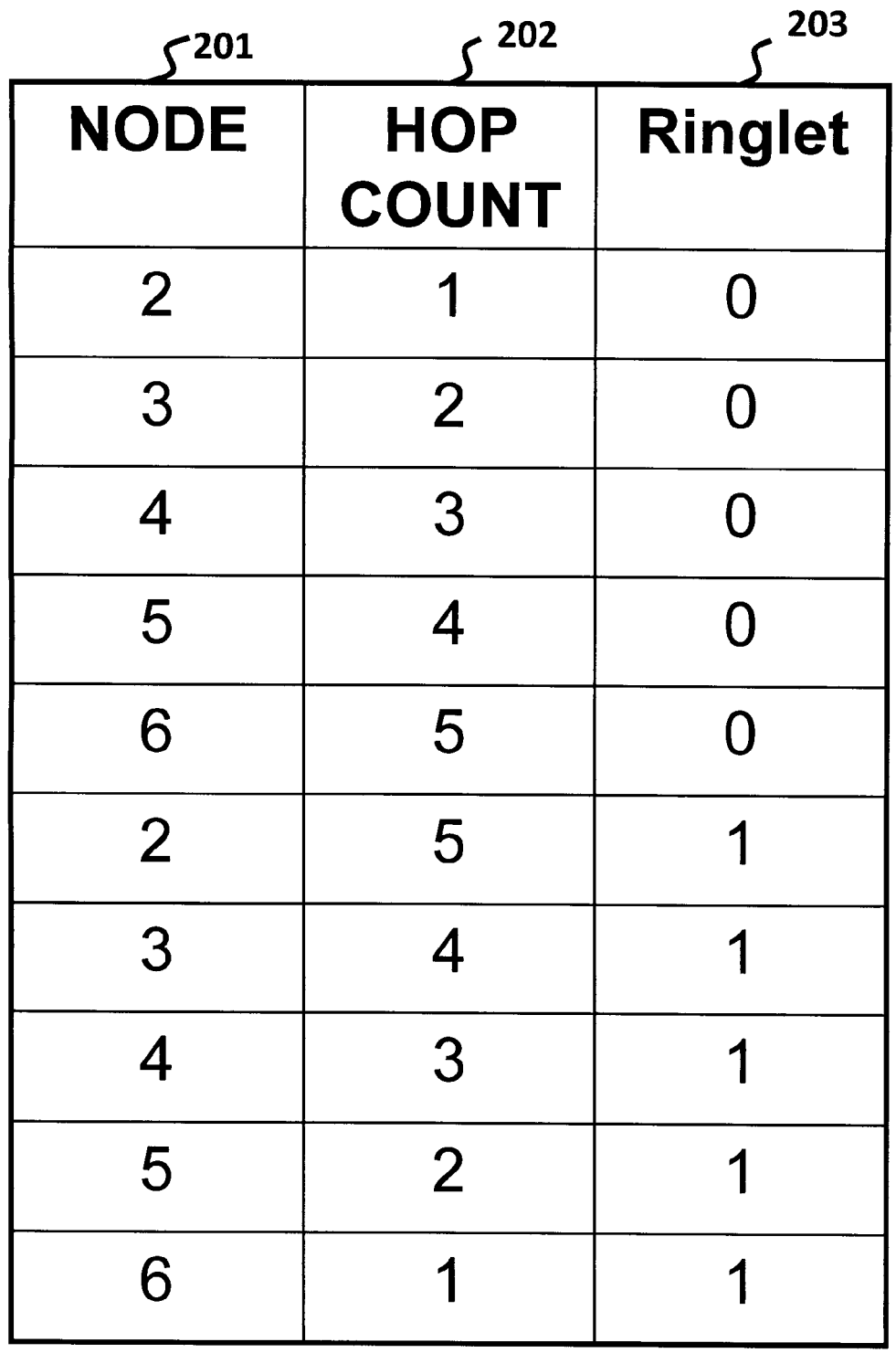
FIG. 2 is a diagram showing a network configuration table 200 of a node 1.

A column 201 of FIG. 2 shows nodes other than the node 1 existing on the ring network 7. A column 202 shows hop counts indicating how many hops those nodes are away from the node 1. A column 203 shows values indicating any of the two rings of the dual ring network. In the column 203, "0" indicates a ring in which data or a frame is transmitted clockwise in FIG. 1; "1" indicates a ring in which data or a frame is transmitted counterclockwise in FIG. 1. For example, the node 2 is adjacent to the node 1 on the ring in which data or a frame is transmitted clockwise, so its hop count is 1. On the other hand, the node 2 is a node remotest from the node 1 on the ring in which data or a frame is transmitted counterclockwise, so its hop count is 5.

The network configuration table shown in FIG. 2 is constructed as follows. That is, when the node 1 is connected to the network, it sends messages (topology discovery messages) for exploring other nodes existing on the ring network, into the network. Then the messages are received by other nodes. Thus, the above-mentioned table is constructed in the node 1's database.

IEEE 802.17B-Based Nodes

The IEEE 802.17b-based nodes 2 and 6 also each have a database. Each database contains a network configuration table 200' having a configuration similar to that shown in FIG. 2 and a remote node route table 206 (SDB: SAS association database) indicating the correspondences between remote nodes and nodes. By way of example, the network configuration table 200' and the remote node route table 206 included in the node 6 are shown in FIG. 3. In FIG. 3, a column 201' of the network configuration table 200' shows nodes other than the node 6 existing on the ring network 7. A column 202' shows hop counts indicating how many hops these nodes are away from the node 6. A column 203' shows values indicating any ring of the dual ring network. In the column 203', "0" indicates the ring in which data or a frame is transmitted counterclockwise in FIG. 1 and "1" indicates the ring in which data or a frame is transmitted clockwise in FIG. 1. The concept of the network configuration table 200' is similar to that of the network configuration table 200 included in each of the nodes 1, 3, 4, and 5.

A column 204 of the remote node route table 206 shows the MAC addresses of nodes to which remote nodes are connected. Since the remote node route table 206 is a remote node route table of the node 6 shown in FIG. 1, the node column 204 shows the nodes 1, 2, and 4. A destination address column 205 shows the MAC addresses of the remote nodes A, B, and C that are connected to the nodes 1, 2, and 4, respectively.

Figure 4:
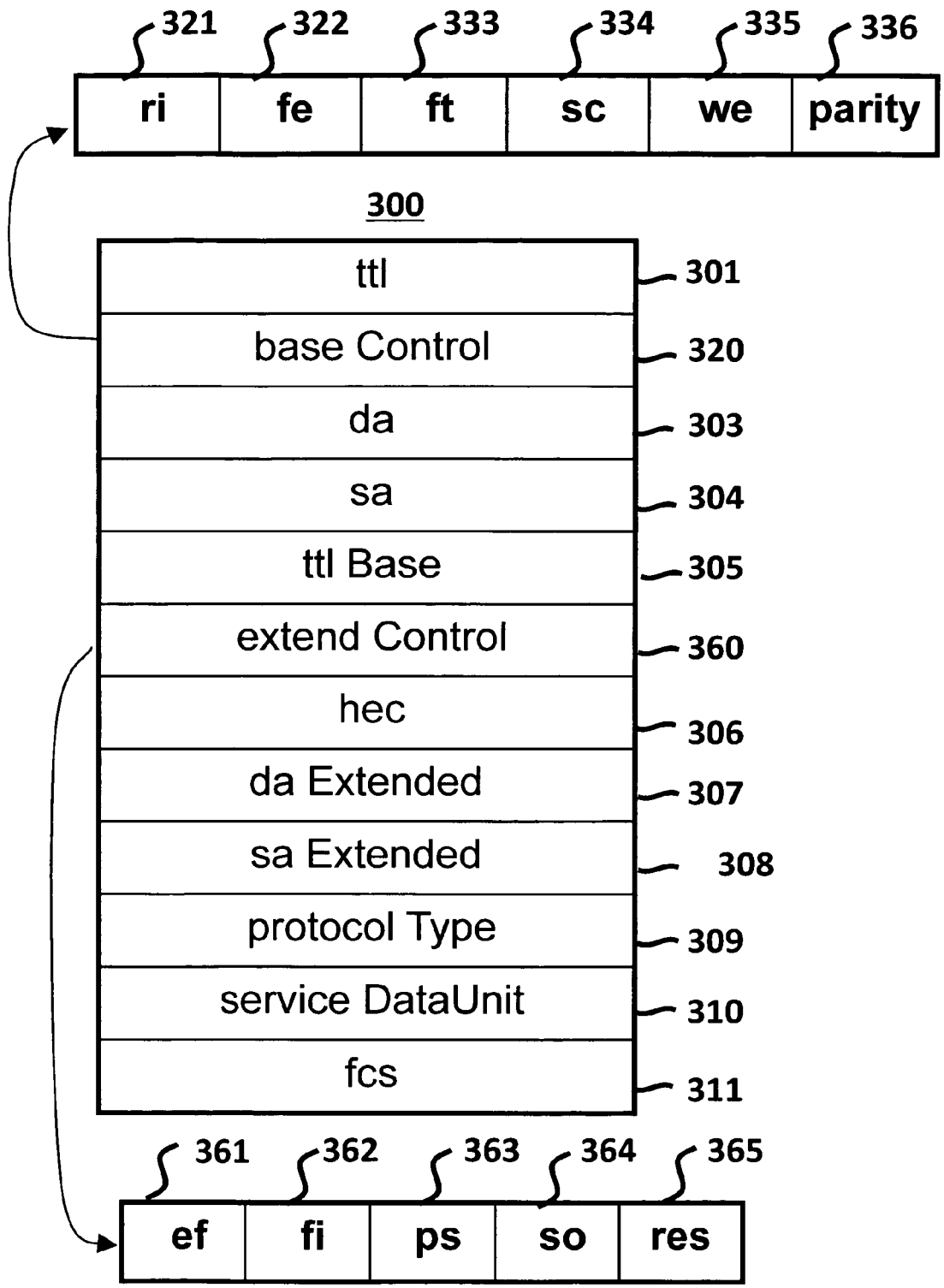
FIG. 4 is a diagram showing a configuration of a data frame.

FIG. 1 shows a case in which data is transmitted from the remote node A to the remote node B and a case in which data is transmitted from the remote node D to the remote node B. Data is transmitted between the remote nodes using a frame containing a packet data. FIG. 4 shows a data frame 300 to be transmitted from a remote node when the remote node transmits data.

The configurations of blocks of the data frame 300 shown in FIG. 4 will now be described.

A ttl 301 shows the hop counts by which the data frame is transmissible on the ring network. The ttl is decremented by one each time the frame passes through one node. It becomes "1" at a node located immediately before the boundary of the network, and the frame is no longer transmitted to any nodes ahead of the boundary.

A baseControl 320 shows basic items in transferring a packet and is segmentized into a ri 321, a fe 322, a ft 323, as sc 324, a we 325, and a parity 326.

The ri 321 shows which ring of the dual ring network is used.

The fe 322 shows whether or not the packet is a packet to be subjected to a fairness process.

The ft 323 shows the type of the packet frame to be transmitted.

The sc shows the class of the data to be transmitted.

The we 325 shows the protection type (wrapping, steering).

The parity 326 shows an error correction bit.

The da 303 shows the destination MAC address. In the case in which data is transmitted from the remote node A to the remote node B, which is shown in FIG. 1, the da 303 shows the MAC address of the remote node B.

The sa 304 shows the source MAC address. In the above-mentioned case, it shows the MAC address of the node 1.

The ttlBase 305 shows the initial value of the ttl. The boundary 10 of the network is located between the nodes 3 and 4 in FIG. 1, so the ttlBase 305 of the frame becomes 2 if the packet frame from the remote node A is transmitted on the clockwise ring; it becomes 3 if the packet frame from the remote node A is transmitted on the counterclockwise ring.

The extendControl 360 shows the description on the extension of frame control. The description is divided into an ef 361, an fi 362, a ps 363, a so 364, and a res 365.

The ef 361 shows the presence/non-presence of an extended frame.

The fi 362 shows the flooding state of the dual ring network.

The ps 363 shows whether or not a return process has been performed at a node at occurrence of a failure.

The so 364 shows whether or not a system for confirming that the frame has been transmitted to the destination remote node is used.

The res 365 is spare and shows no description.

The hec 306 shows an error correction bit.

The daExtended 307 shows the destination MAC address.

The saExtended 308 shows the MAC address of the source remote node.

The protocolType 309 shows the type of the protocol to be used when the frame is transmitted at the source address.

The serviceDataUnit 310 shows data serving as a payload.

The fcs 311 shows an error correction bit.

FIG. 1 uses solid lines to show the case in which a packet is transmitted from the remote node A to the remote node B using a frame having the configuration shown in FIG. 4. FIG. 1 uses a dotted line to show the case in which a packet is transmitted from the remote node D to the remote node B. The remote nodes D and B are connected to the IEEE 802.17b-based nodes 6 and 2, respectively, so the node 6 is able to determine the shortest route for transmitting the packet to the remote node B on the basis of the network configuration table 200' and the remote node route table 206 shown in FIG. 3 so as to transmit the packet as a unicast to the node 2 on the clockwise ring. Since the node 2 has already learned about the remote node connected thereto, it transfers the packet of the frame upon detection of the address of the remote node B from the daExtended shown in FIG. 4. In the case in which a packet is transmitted from the remote mode A to the remote node B, the node 1 to which the remote node A is connected cannot learn about a remote node serving as a destination. This is because the node 1 is an IEEE 802.17-based node and the network configuration table contains only the MAC addresses of the nodes on the ring network. Thus, the node 1 transmits the packet from the remote node A into both the clockwise ring and the counterclockwise ring, using an IEEE 802.17-based flooding frame. Such frame flows are indicated by the solid lines. Conventionally, once such IEEE 802.17-based flooding frames from the node 1, which are indicated by the solid lines, reach the nodes 6 and 2, these flooding frames must also be transmitted to the nodes 5 and 4 and the node 3, respectively, as indicated by the chain double-dashed lines. However, in this embodiment, these frames are stripped (meaning that a frame is eliminated from a ring network and discarded) without being transferred to the nodes ahead of the nodes 6 and 2, although they are IEEE 802.17-based flooding frames from the node 1. This allows a reduction in the transmission band to be used by the flooding frames, thereby effectively using the transmission band.

Figure 5:
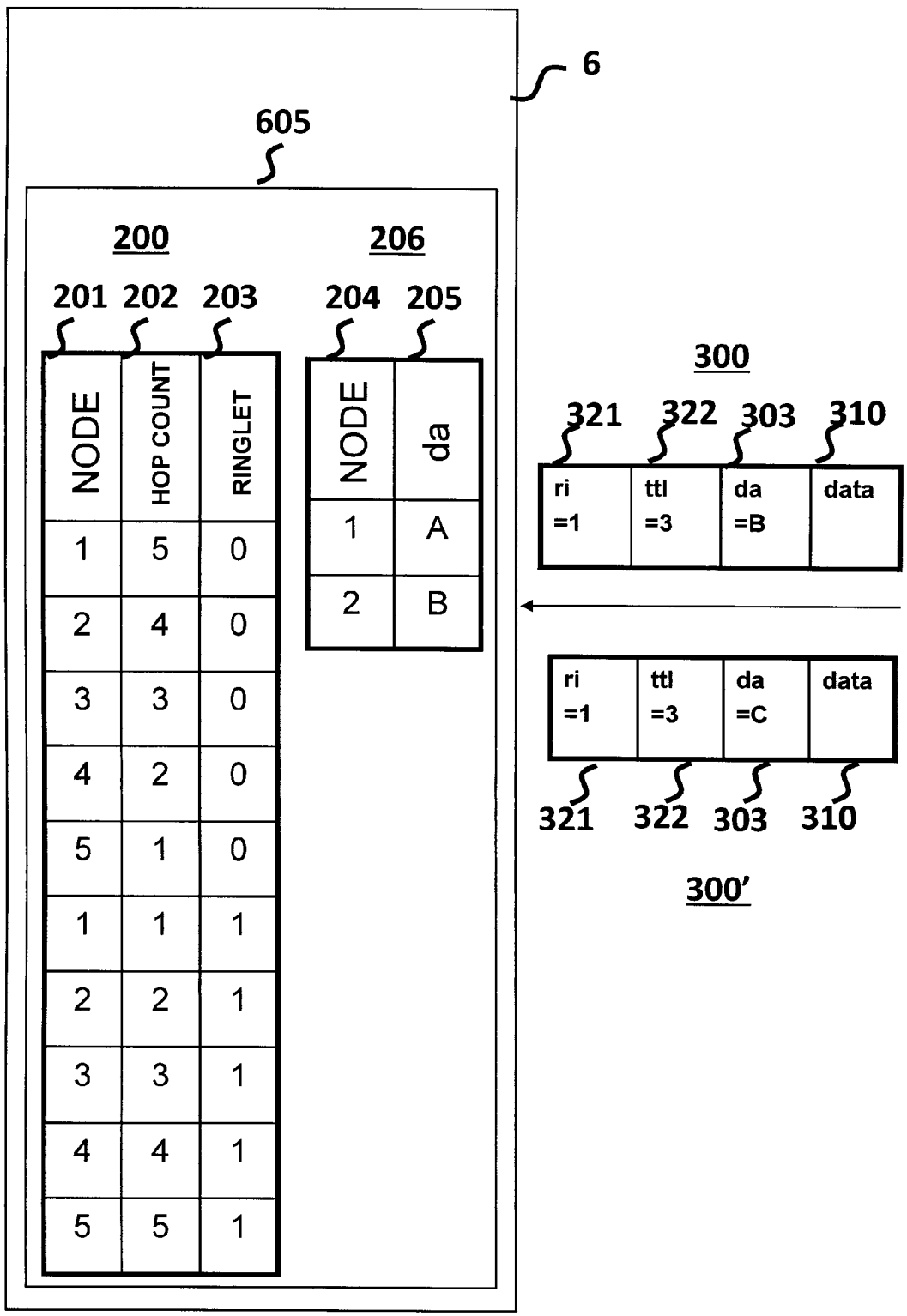
FIG. 5 is a diagram showing an operation of the node 6.

FIG. 5 is a diagram showing an operation of the node 6 shown in FIG. 1. As shown in FIG. 5, the IEEE 802.17b-based node 6 is provided with a database 605 containing the network configuration table 200 and the remote node route table 605 regarding remote nodes. These tables are an example of the database of the node 6 shown in FIG. 3. FIG. 5 shows a case in which the node 6 receives a flooding frame 300 whose destination is the remote node B and a case in which the node 6 receives a flooding frame 300' whose destination is the remote node C. The ri, ttl, and da of the frame 300 are 1, 3, and B, respectively. Therefore, the remote node that has transmitted the frame 300 shown in FIG. 5 is a node located upstream of the node 6 on the clockwise ring (Ringlet 1). Upon reception of the flooding frame 300, the node 6 compares the destination address of the frame 300 with the MAC addresses in the remote node route table 206. Thus, it recognizes that the flooding frame 300 is a flooding frame destined for the remote node B and that the remote node B is a subordinate of the node 2. The hop count required for reaching the node 2 on the Ringlet 1 is 2 according to the network configuration table 200. Since the ttl of the frame is 3, the frame can reach the third node from the node 6. Since the hop count, 2, required for reaching the node 2 is smaller than the hop count described in the frame, the node 6 transfers the frame to a downstream node. When the node 6 receives the frame 300', whose destination is the remote node C, on the clockwise ring (Ringlet 1), it transmits the frame 300' to a downstream node as well because the remote node route table does not contain information on the remote node C.

Figure 6:
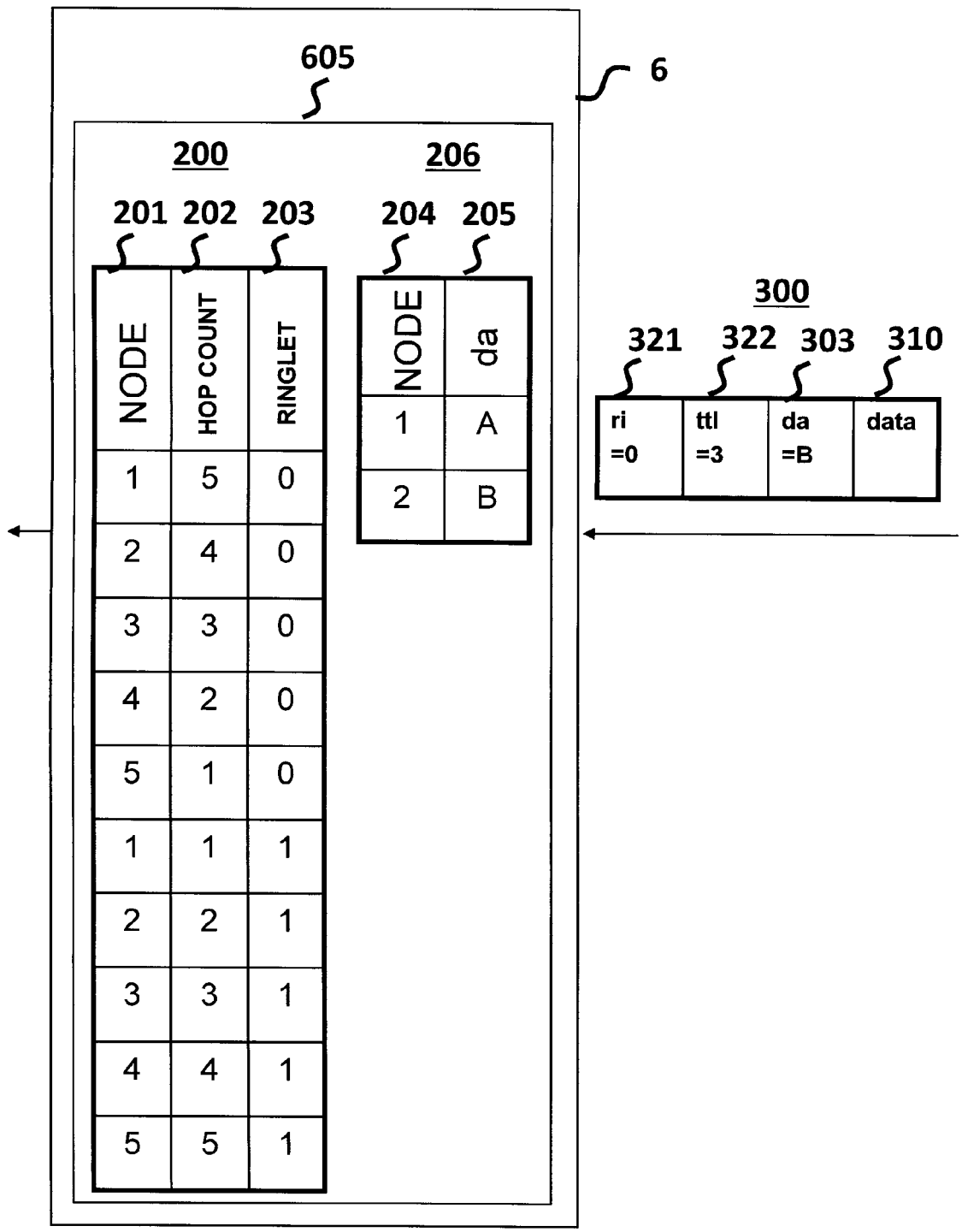
FIG. 6 is a diagram showing an operation of the node 6.

A frame stripping operation to be performed by the IEEE 802.17-based node 6 when the node 6 receives a flooding frame will be described below. FIG. 6 is a diagram showing an operation of the node 6 of FIG. 1. As shown in FIG. 6, the IEEE 802.17b-based node 6 includes the remote node route table 206 regarding remote nodes, which is shown in FIG. 3. The remote node route table 206 shown in FIG. 3 is an example of the database of the node 6. FIG. 6 shows a case in which the node 6 receives the flooding frame 300 whose destination is the remote node B. The ri, ttl, and da of the frame 300 are 0, 3, and B, respectively. Therefore, the node or remote node that has transmitted the flooding frame 300 shown in FIG. 6 is a node located upstream of the node 6 on the counterclockwise ring (Ringlet 0). Upon receipt of the flooding frame 300, the node 6 compares the destination address of the frame 300 with the MAC addresses of the remote node route table 206. Thus, it recognizes that the flooding frame 300 is a flooding frame destined for the remote node B and that the remote node B is a subordinate of the node 2. The hop count required for reaching the node 2 on the Ringlet 0 is 4 according to the network configuration table 200. Since the ttl of the frame is 3, the frame can reach the third node from the node 6. Since the hop count required for reaching the node 2 is larger than the hop count included in the frame, the node 6 is able to determine that even if it transmits the flooding frame to a downstream node, the frame will not reach the destination. Thus, the node 6 strips the flooding frame.

In addition to the method of using the hop count to determine whether or not the frame should be stripped, as described above, there is also a method of using the network boundary as shown in FIG. 1 to make such a determination. Specifically, first, the node detects the network boundary from the ttl shown in FIG. 4. Then, the node 6 compares the address of the remote mode, which is the destination MAC address of the frame, with the MAC addresses in the remote node route table 206 of data base 605 so as to detect the node to which the destination remote node is connected. Then the node 6 refers to the network configuration table 200. If the detected node has a hop count exceeding that of the network boundary 10, the node 6 strips the received frame.

The above-mentioned stripping operation is performed in a state in which the frame is transmissible. The state in which the frame is transmissible refers to a state in which there is no problem such as a forward error correction (FEC) error or congestion and in which the frame is transferable to a downstream node.

Learning (update of the remote node route table 206) is performed in a case in which a node receives a flooding frame and a case in which a node receives a frame from a remote node. If the node 6 receives a flooding frame on the ring network, it refers to the remote node route table 206. Then the node 6 writes the sa and saExtended of the frame into the remote node route table 206. The sa is written into the node column 204 of the remote node route table 206. The saExtended is written into the destination address column 205 thereof. Thus, the remote node route table 206 is updated each time a flooding frame is received.

If the node 6 receives a frame from the remote node D, it also learns about the remote node D. It extracts from the packet the MAC address of the remote node D, the MAC address of the node 6, and information on the type of the standard supported by the node 6. Then the node 6 adds the extraction result to the remote node route table 206.

Figure 7:
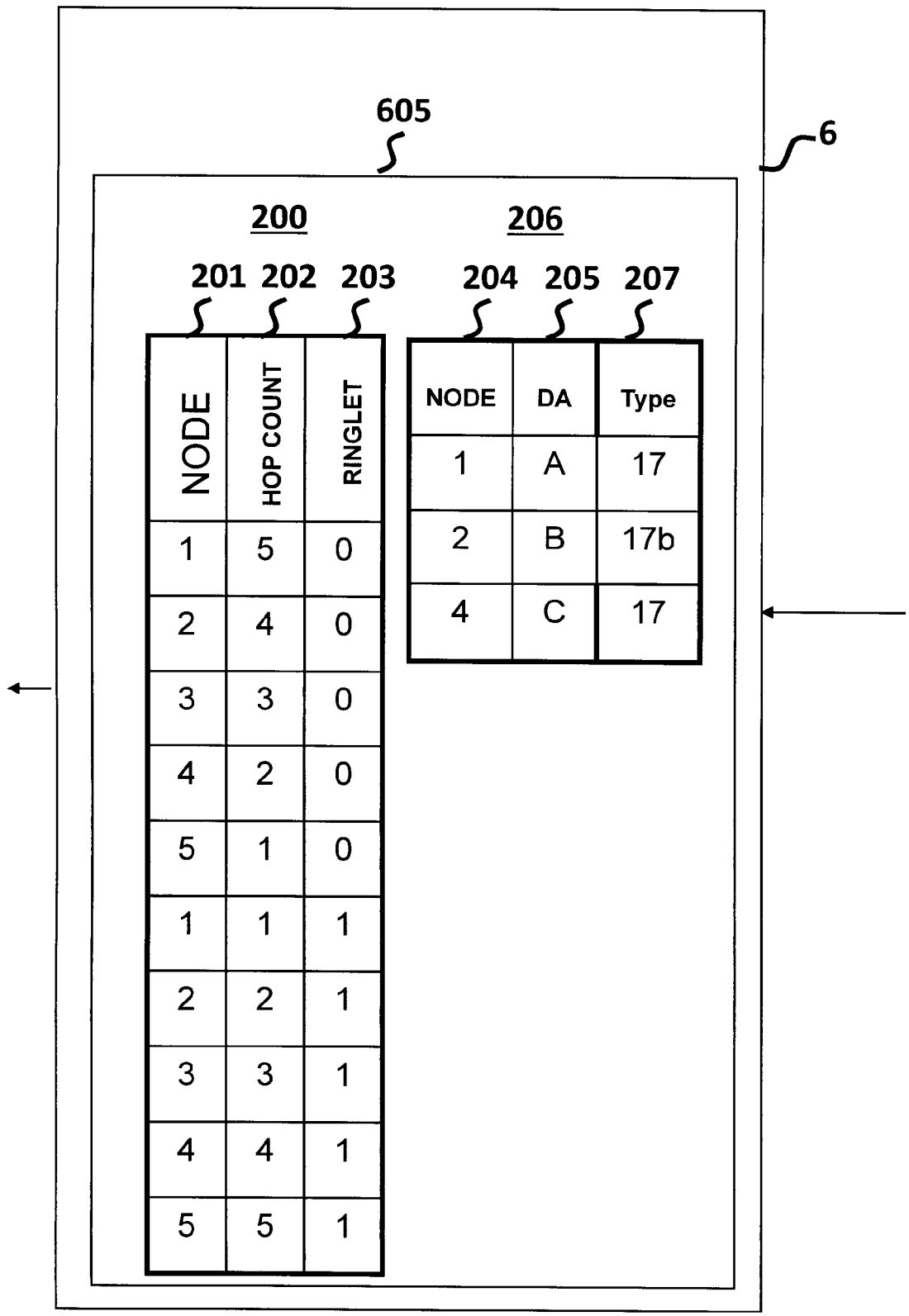
FIG. 7 is a diagram showing a configuration of the database of the node 6.

When learning is performed, information on the type of the source node of the flooding frame is also added to the SDB, as shown in the remote node route table 206 of the node 6 shown in FIG. 7. The type is identified noting that if the MAC address of the da is an address (SAS group address) targeted for all nodes, the type is IEEE 802.17b-based, and if the MAC address is an address other than the SAS group address, the type is IEEE 802.17-based.

A method of transmitting a frame at the IEEE 802.17b-based node 6 shown in FIG. 1 will now be described. The node 6 refers to the remote node route table 206 to determine the destination node. If the destination RPR node is IEEE 802.17b-based, the node 6 transmits the frame as a unicast. For example, the node 2 is IEEE 802.17b-based in FIG. 1, so the node 6 transmits the frame as a unicast if the MAC address of the destination node is that of the node 2 or the remote node B, which is a subordinate of the node 2. If the destination node is IEEE 802.17-based, the node 6 floods the frame. When the node 6 performs flooding, it sets up DA=0x0180c2xxxxxx for the frame.

Figure 8:
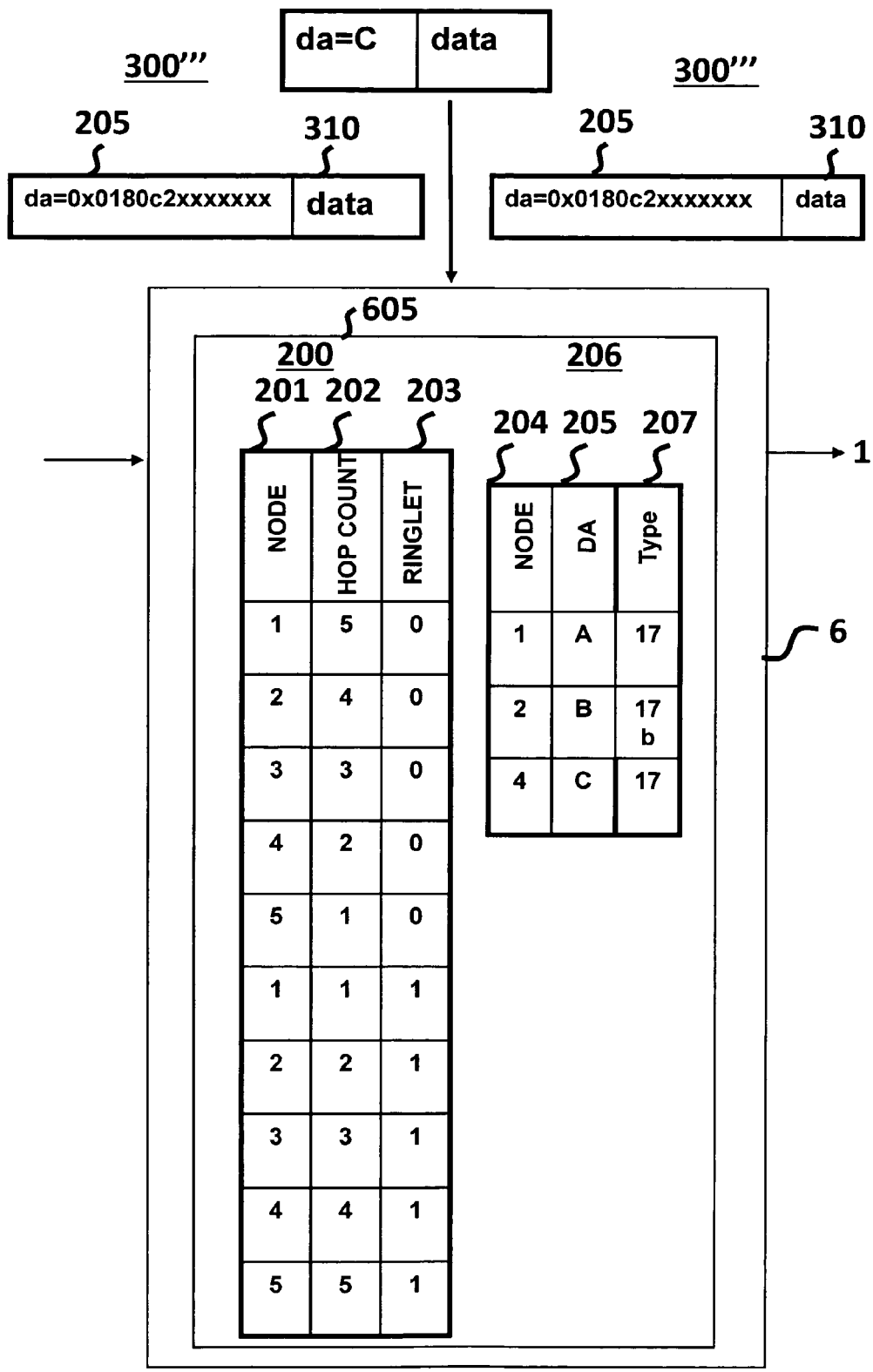
FIG. 8 is a diagram showing an operation of the node 6.

FIG. 8 is a diagram showing the node 6. FIG. 8 shows that the destination of a frame is the remote node C and that the route table contains information on the route to the remote node C. Since the destination node is IEEE 802.17-based, the node 6 transmits a flooding frame 300''' to the node 1 on the ringlet 1 and an identical frame to the node 5 on the ringlet 0. That is, in this embodiment, even if an IEEE 802.17b-based node has already learned about the address of the destination remote node, it transmits a flooding frame if the destination node is an IEEE 802.17-based.

Figure 9:
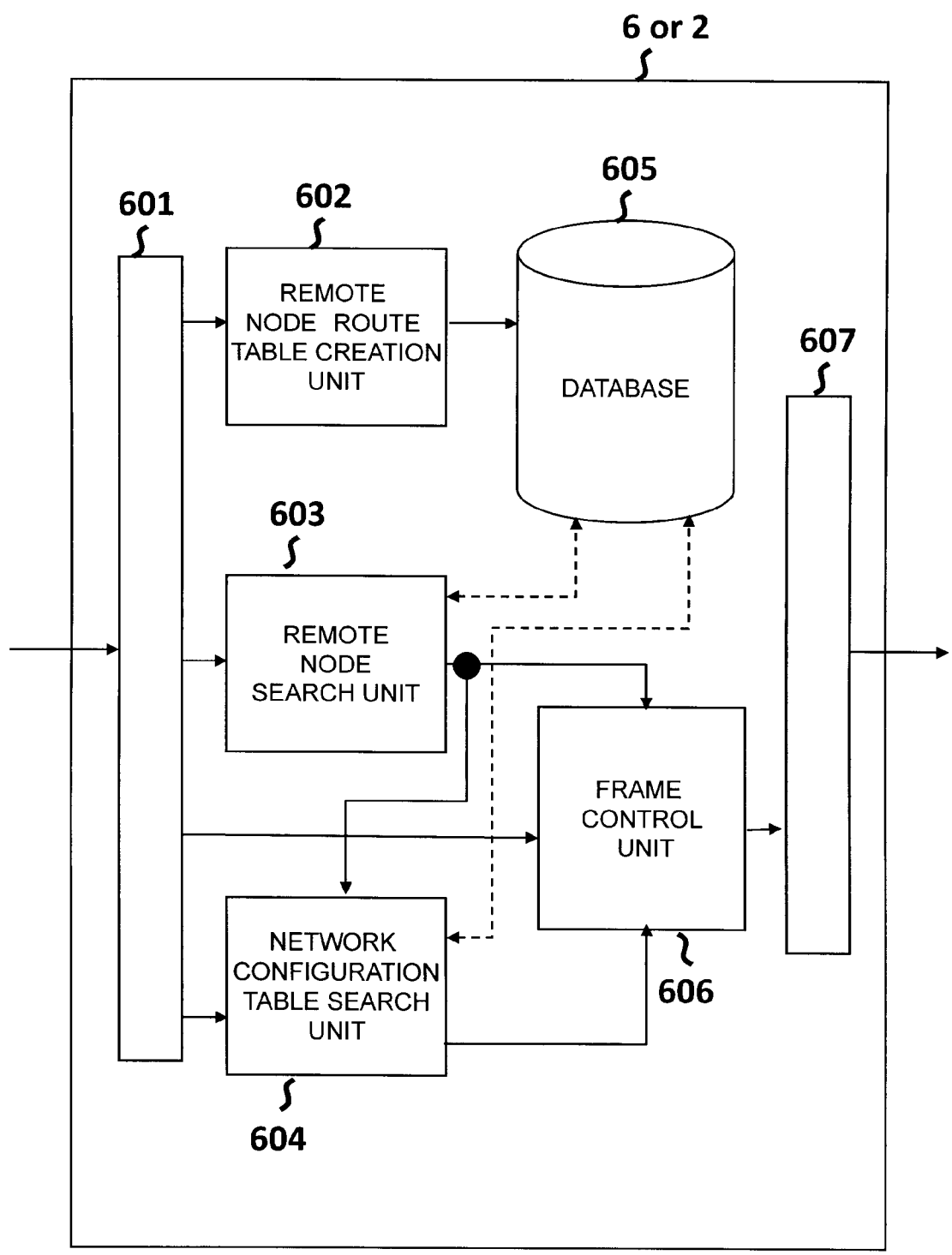
FIG. 9 is a functional block diagram of the IEEE 802.17b-based nodes 6 and 2.

FIG. 9 shows a functional block diagram for the IEEE 802.17b-based nodes 6 and 2 of FIG. 1. As illustrated, these nodes each includes a frame reception unit 601, a remote node route table creation unit 602, a remote node search unit 603, a network configuration table search unit 604, a database 605, a frame control unit 606, and a frame transmission unit 607.

The frame reception unit 601 receives a frame from the ring network. If the frame from the frame reception unit 601 is a flooding frame, the remote node route table creation unit 602 writes the sa of the frame into the node column 204 of the remote node route table 206 in the database 605 and also writes the MAC address of the remote node described in the saExtended of the frame into the destination address column 205 of the table 206. Upon receipt of the frame from the frame reception unit 601, the remote node search unit 603 refers to the remote node route table 206 to check if the destination remote node has been learned about or not. Then, it transmits the check result to the frame control function 606. The network configuration table search unit 604 searches the network configuration table 200 of the database 605 for the relation between the MAX address of the destination node, which has been obtained from the result of the search performed by the remote node search unit 603, and hop count. The flooding frame control function 606 determines whether to transfer or strip the received frame on the basis of the search results from the network configuration table search unit 604 and the remote node search unit 603. If the flooding frame control function 606 determines that the received frame should be transferred, the frame transmission unit 607 transfers the flooding frame onto the ring network.

Figure 10:
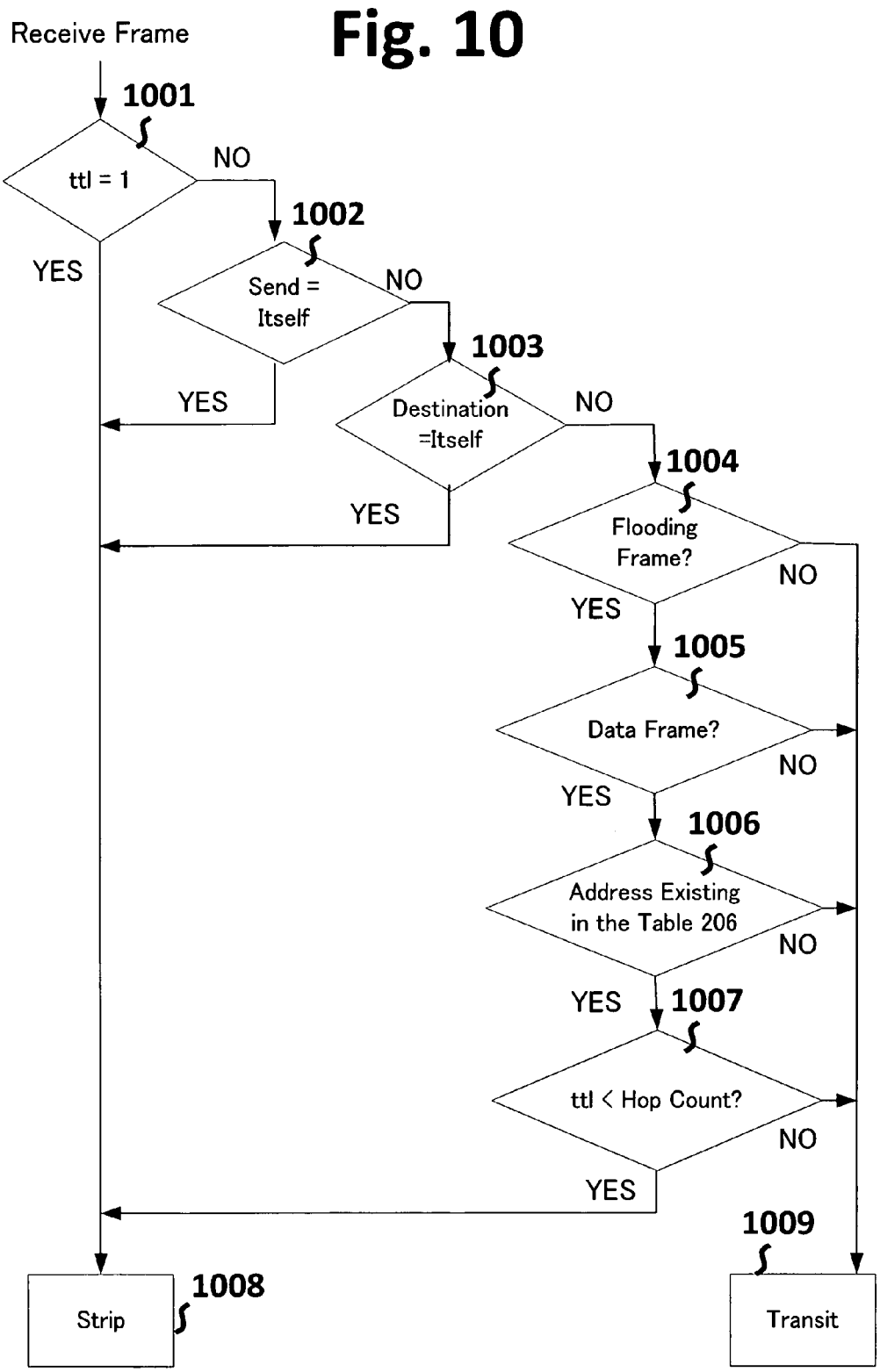
FIG. 10 is a flowchart of a flooding frame control function 606.

FIG. 10 shows the flowchart of operations of the frame control function 606.

Step 1001: the ttl is checked upon reception of a frame. If the ttl is 1, the flowchart proceeds to step 1008 for stripping a frame; if not so, the flowchart proceeds to step 1002.

Step 1002: if the source MAC address described in the sa of the frame is the MAC address of the node itself that has received the frame, the flowchart proceeds to step 1008 for stripping a frame; if not so, the flowchart proceeds to step 1003.

Step 1003: if the destination MAC address described in the da of the frame is the MAC address of the node itself that has received the frame, or a remote node subordinate thereto, the flowchart proceeds to step 1008 for stripping a frame; if not so, the flowchart proceeds to step 1004.

Step 1004: if the fi of the received frame is a flooding frame, the flowchart proceeds to step 1005; if not so, the flowchart proceeds to step 1009 so as to transfer the frame.

Step 1005: if the ft of the received frame is a data frame, the flowchart proceeds to step 1006; if not so, the flowchart proceeds to step 1009 so as to transfer the frame.

Step 1006: if the destination MAC address of the received frame exists in the remote node route table 206, the flowchart proceeds to step 1007; if not so, the flowchart proceeds to step 1009 so as to transfer the frame.

Step 1007: if the hop count from the node that has received the frame up to the destination node (node to which the destination remote node is connected) is larger than the ttl value of the received frame, the flowchart proceeds to step 1008 so as to strip the frame; if not so, the flowchart proceeds to step 1009 so as to transfer the frame.

The transfer of data at each node and update of the remote node route table 206 after startup of the system will now be described with reference to FIGS. 11 to 25. In FIGS. 11 to 25, components identical to those shown in FIGS. 1 to 10 are given identical reference numerals. In FIGS. 11 to 25, the nodes 1, 3, 4, and 5 are IEEE 802.17-based; the nodes 2 and 6 are IEEE 802.17b-based. The clockwise ring is defined as Ringlet 1; the counterclockwise ring as Ringlet 0. Each node is initially in a state in which it has learned nothing about the remote modes, in other words, there is no description in the remote node route table 206 of each node.

Figure 11:
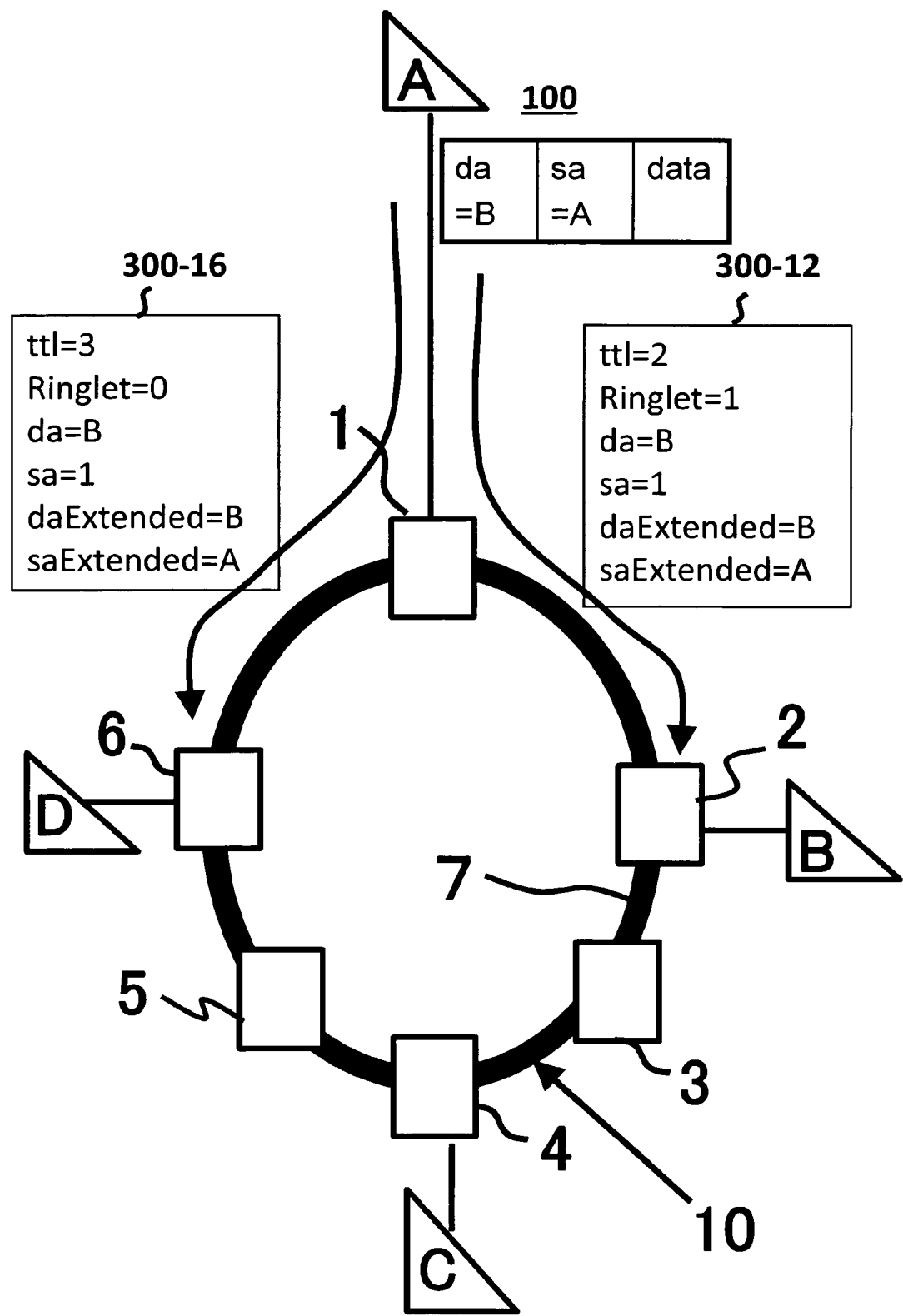
FIG. 11 shows the state in which a packet is being transmitted from a remote node A.

FIG. 11 shows a case in which a packet is transmitted from the remote node A onto the ring network in an initial state. The remote node A transmits a packet 100 to the node 1. The packet 100 contains at least the destination address da and the source address sa. The da and sa of the packet 100 are B and A, respectively.

The node 1 that has received the packet 100 is IEEE 802.17-based, so it floods the packet onto both Ringlet 1 and Ringlet 2. The boundary point 10 for the flooding performed by the node 1 is a portion between the nodes 3 and 4. A frame 300-12 that is flowing on the Ringlet 1 from the node 1 includes ttl=2, Ringlet=1, da=B, sa=1, daExtended=B, and saExtended=A. A frame 300-16 that is flowing on the Ringlet 0 from the node 1 includes ttl=3, Ringlet=0, da=B, sa=1, daExtended=B, and saExtended=A.

Figure 12:
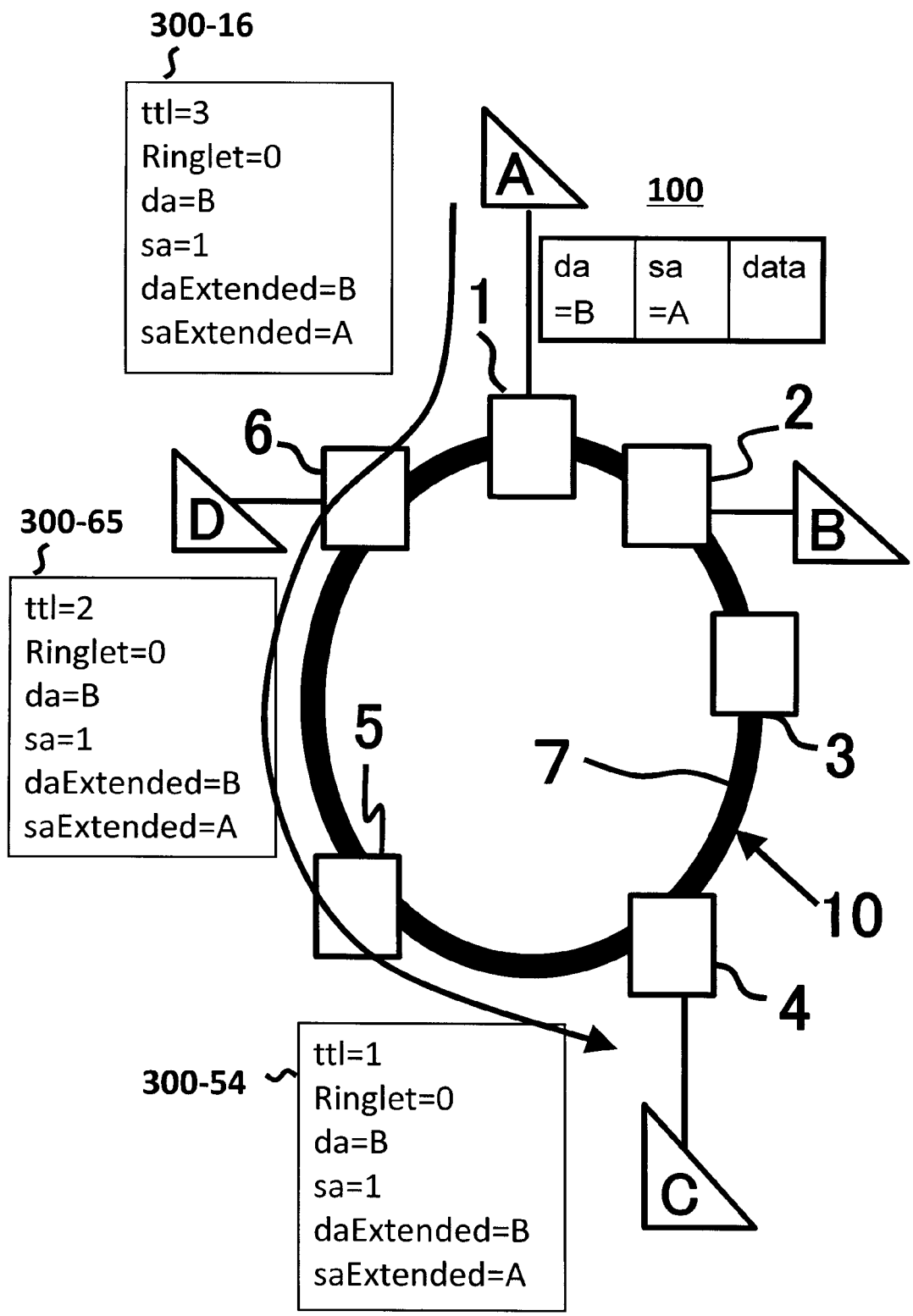
FIG. 12 is a diagram showing a frame flowing on a Ringlet 0.
Figure 13:
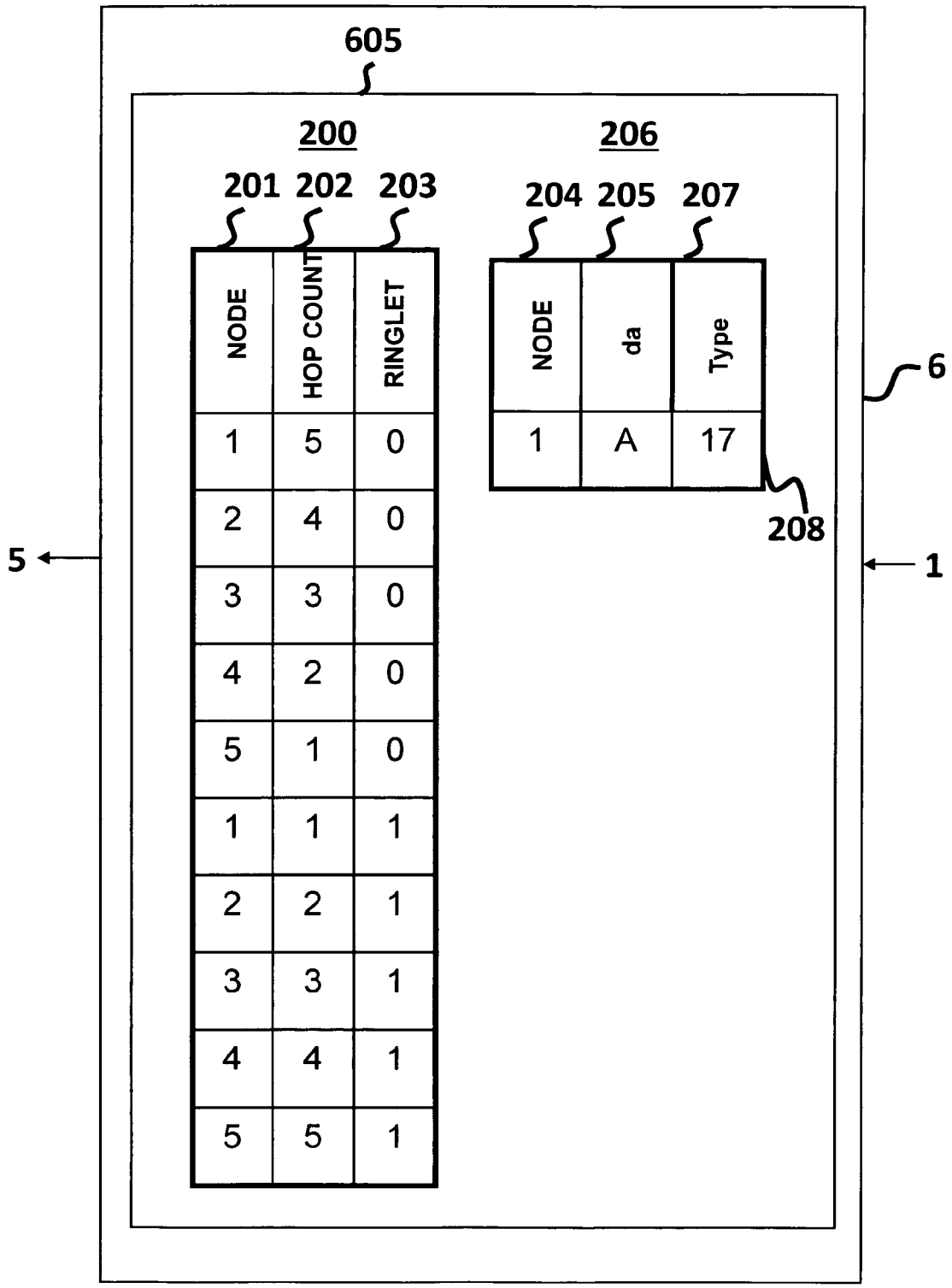
FIG. 13 is a diagram showing a configuration of the database of the node 6.

A frame that is flowing on the Ringlet 0 after the packet 100 has been transmitted in FIG. 11 is shown in FIG. 12. Upon receipt of the frame 300-16 from the node 1, the node 6 searches the remote node route table 206 of the database 605 for information on the remote node B that is described in the destination address 303 of the received frame. Since the remote node route table 206 is yet to have information on the remote node B, it transfers the frame to the node 5 located downstream thereof. At that time, the node 6 decrements the value of the ttl 322 by one. Thus, a frame 300-65 transferred from the node 6 to the node 5 includes ttl=2, Ringlet=0, da=B, sa=1, daExtended=B, and saExtended=A. The node 6 also detects information on the remote node A and the node 1 from the received frame 300-16. Then, as shown in FIG. 13, the node 6 adds a row 208 to the remote node route table 206 of the database 605 and writes the remote node A into the DA column 205 of the row 208, the node 1 into the node column 204 thereof, and the standard supported by the node 1 into a type column 207 thereof, on the basis of the detected information.

Next, upon receipt of the frame 300-65 from the node 6, the node 5 searches the database 605 for the MAC address of the remote node B. Since the node 5 is IEEE 802.17-based, it cannot learn about the remote node B. Therefore, the node 5 transfers a frame 300-54 to the node 4. The frame 300-54 is a frame obtained by decrementing the ttl value of the frame 300-65 by one. The frame 300-54 transferred from the node 5 to the node 4 includes ttl=1, Ringlet=0, da=B, sa=1, daExtended=B, and saExtended=A.

Next, the node 4 receives the frame 300-54 from the node 5. When the node 4 detects the ttl value of the frame 300-54, the ttl value turns out to be 1. Thus, the node 4 recognizes that it is a node serving as the flooding boundary of the ring network. Then, the node 4 strips the frame 300-54. In general, the boundary point is set up in the middle position of the ring network when seen from the source node. This is intended to make the route to the boundary a route that has the smallest hop count.

Figure 14:
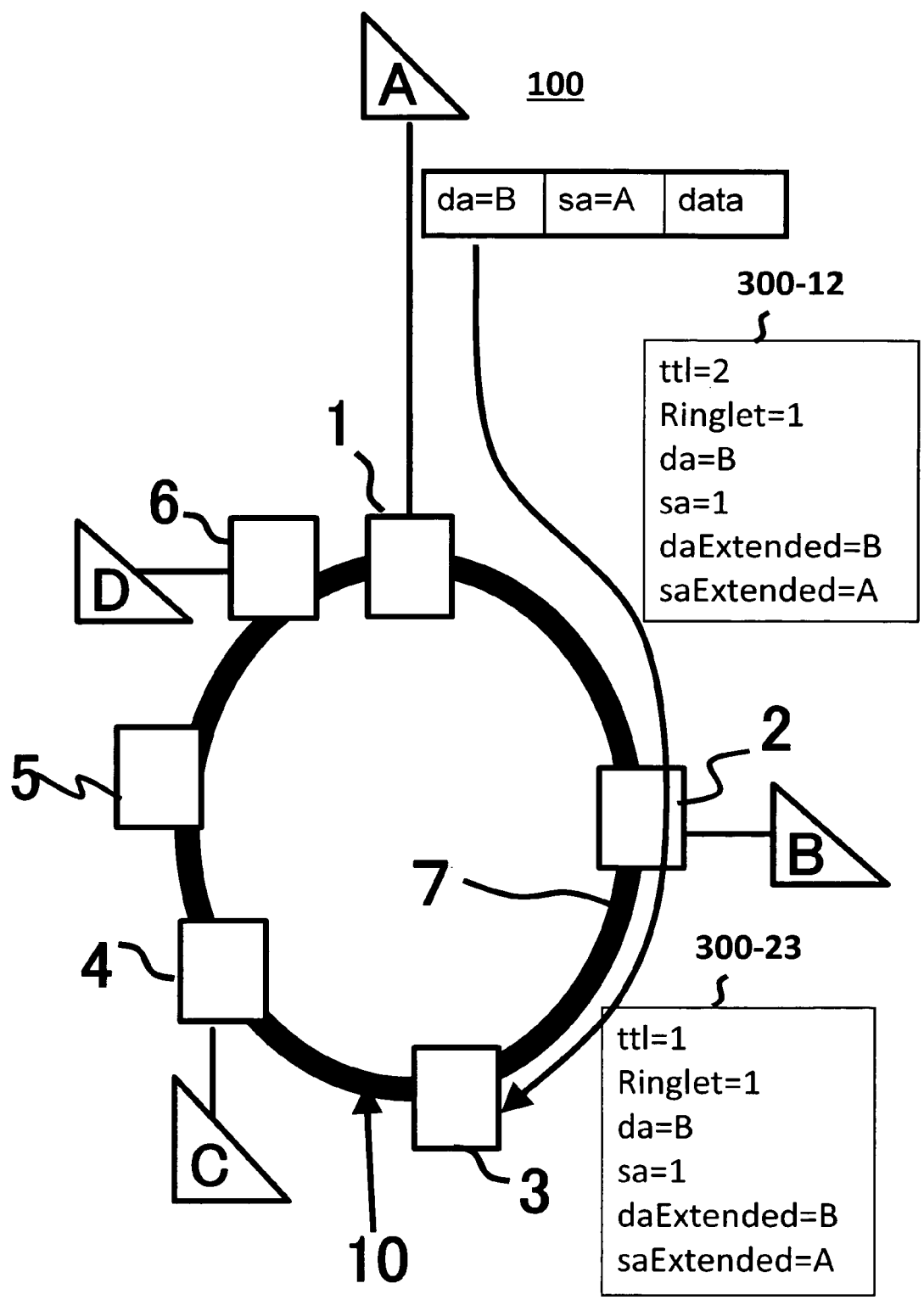
FIG. 14 is a diagram showing a frame flowing on a Ringlet 1.
Figure 15:
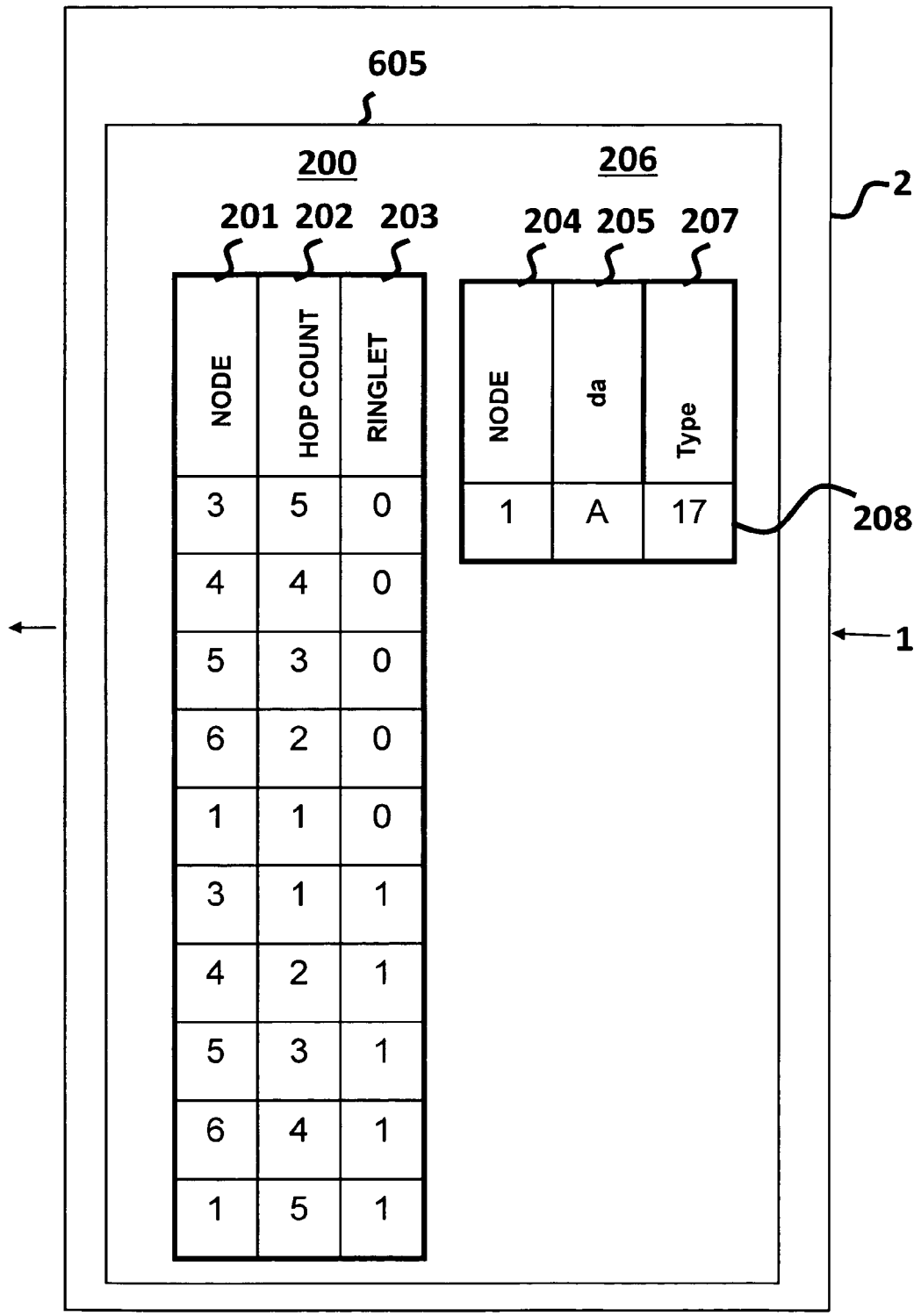
FIG. 15 is a diagram showing a configuration of the database of the node 2.

A frame that is flowing on the Ringlet 1 after the packet 100 has been transmitted in FIG. 11 is shown in FIG. 14. The node 2, which is IEEE 802.17b-based, receives a frame 300-12 from the node 1. The node 2 searches the remote node route table 206 of the database 605 for the address of the remote node B that is the destination address. Since the remote node route table 206 is yet to have information on the remote node B, the node 2 transfers a frame 300-23 to the node 3 located downstream thereof. At that time, the node 2 decrements the value of the ttl by one. Thus, a frame 300-23 transferred from the node 2 to the node 3 includes ttl=1, Ringlet=1, da=B, sa=1, daExtended=B, and saExtended=A. The node 2 also detects information on the remote node A and the node 1 from the received frame 300-12. Then, as shown in FIG. 15, the node 2 adds the row 208 to the remote node route table 206 of the database 605 and writes the remote node A into the DA column 205 of the row 208, the node 1 into the node column 204 thereof, and the standard supported by the node 1 into the type column 207 thereof, on the basis of the detected information. Then, the node 3 that has received the frame 300-23 from the node 2 detects the ttl value of the frame and the ttl value turns out to be 1. Thus, the node 3 recognizes that it is a node serving as the flooding boundary of the ring network. Then, the node 3 strips the frame 300-23.

Figure 16:
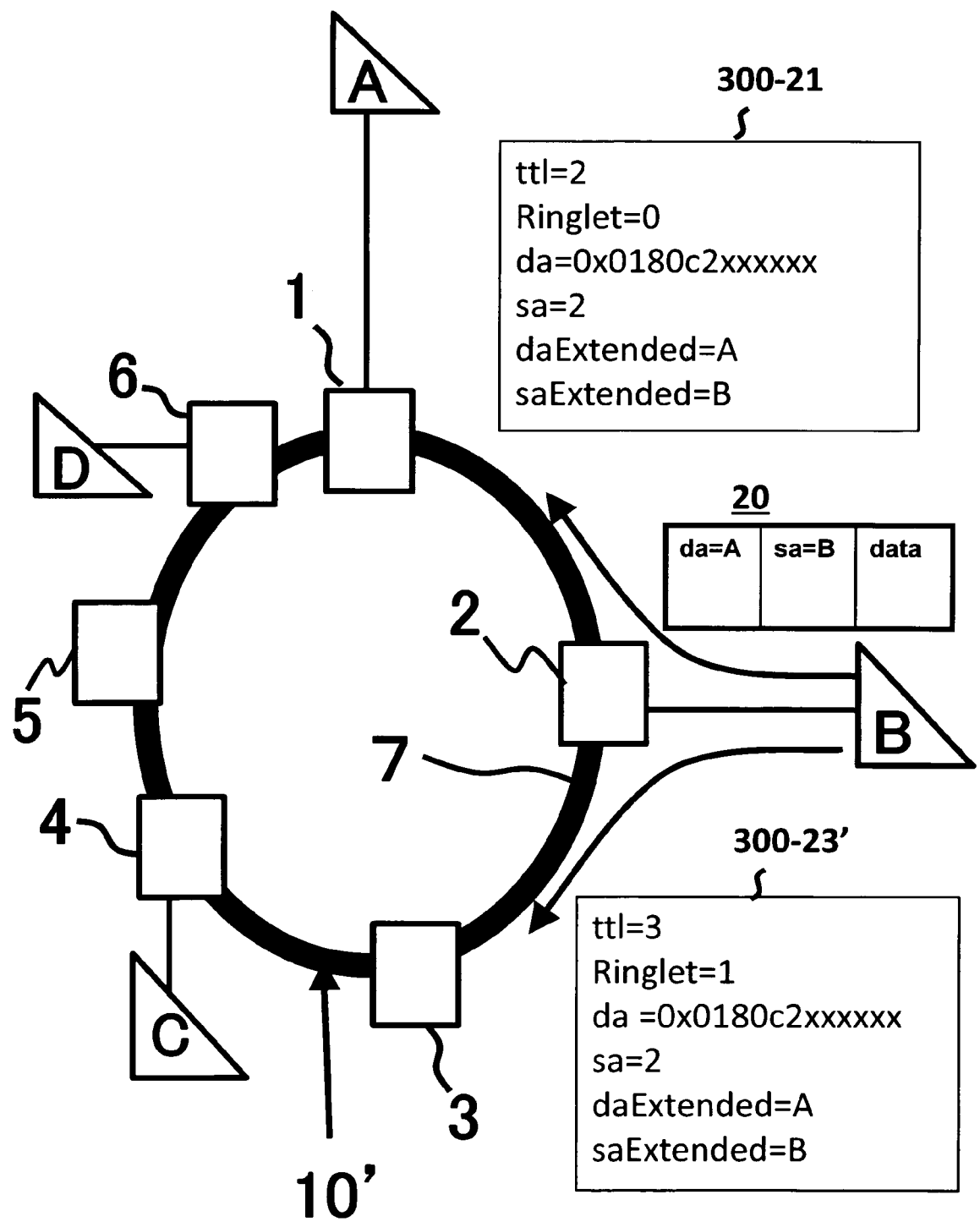
FIG. 16 shows the state in which a packet is being transmitted from a remote node B.
Figure 17:
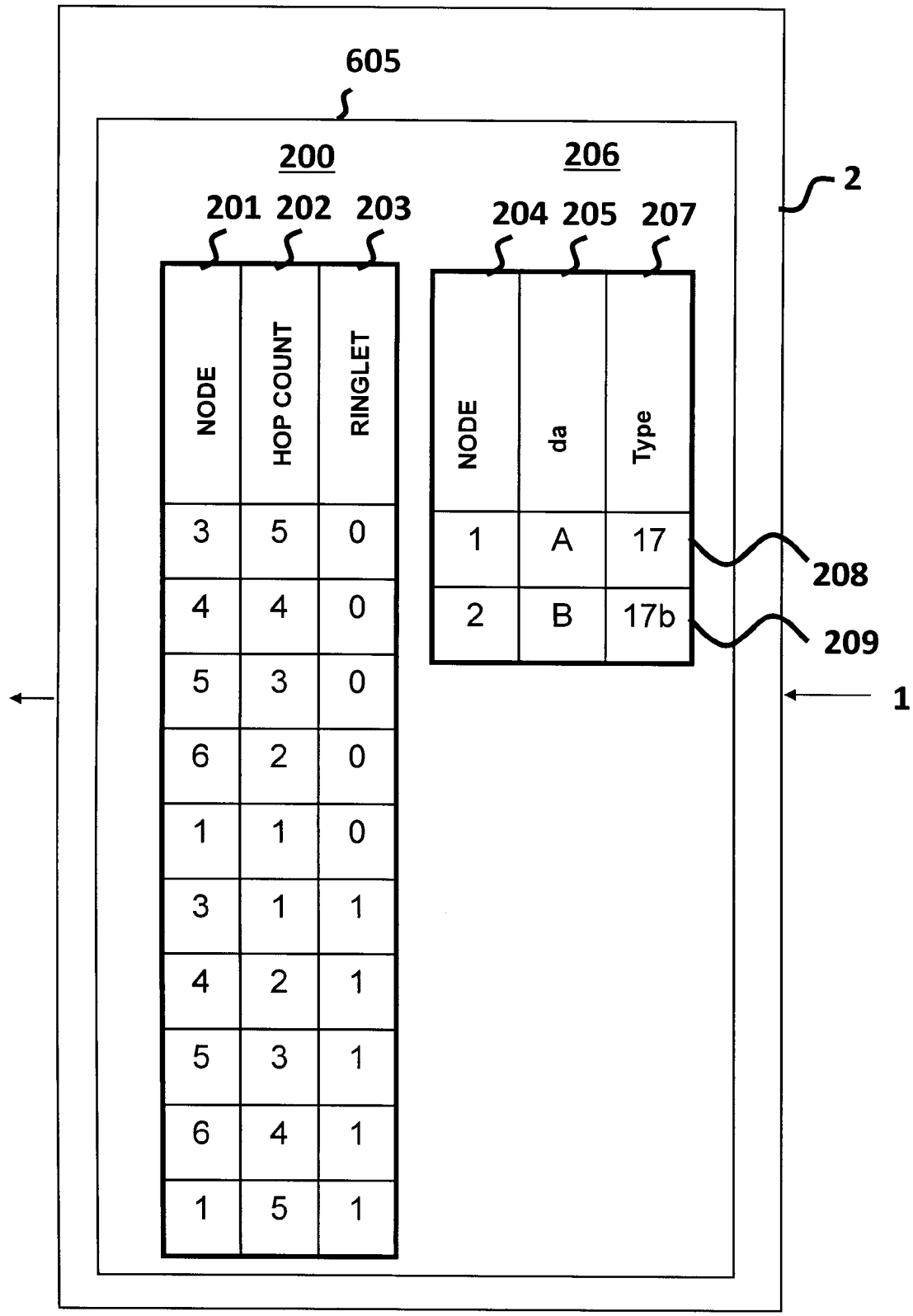
FIG. 17 is a diagram showing a configuration of the database of the node 2.

FIG. 16 shows a case in which a packet is transmitted from the remote node B to the remote node A after the frame flow shown in FIGS. 11 to 15 has been completed. In FIG. 16, a network boundary 10' is set up between the nodes 6 and 5. Upon receipt of a frame 20 from the remote node B, the node 2 searches the remote node route table 206 of the database 605 for information on the remote node A. Here, the node 2 has already learned about information on the remote node A, that is, the node 2 has written information on the remote node A into the remote node route table 206 upon receipt of the frame flowing on the Ringlet 1 in FIG. 14. This results in FIG. 15. Therefore, the node 2 includes the row 208 that contains information on the remote node A. The node 2 refers to the remote node route table 206 and then recognizes that the node 1 to which the remote node A is connected is an IEEE 802.17-based node. Then the node 2 sets up a frame so that the frame corresponds to the standard supported by the node 1 and then floods the frame. Specifically, the da of the frame to be flooded is set to 0x0180C2xxxxxx. The 0x0180C2xxxxxx is an address name to be used when a frame is flooded to all nodes. This address name is stipulated by the standard IEEE 802.17b. The flooding boundary point of the node 2 is set up between the nodes 6 and 5. The frame 300-21 flowing on the Ringlet 0 includes ttl=2, Ringlet=0, da=0x0180C2xxxxxx, sa=2, daExtended=A, and saExtended=B. On the other hand, the frame 300-23' flowing on the Ringlet 1 includes ttl=3, Ringlet=1, da=0x0180C2xxxxxx, sa=2, daExtended=A, and saExtended=B. Since the node 2 has not learned about the remote node B, it extracts from the packet the MAC address of the remote node B, the MAC address of the node 2, and information on the type of the standard supported by the node 2. Then, the node 2 writes the extraction result into the database 605, as shown in FIG. 17. Specifically, the node 2 adds a row 209 to the remote node route table 206 and writes the MAC address of the node 2 into the column 204 of the row 209, the MAC address of the remote node B into the destination remote node column 205 thereof, and information on IEEE 802.17b, which is the type of the standard supported by the node 2, into the type column 207 thereof.

Figure 18:
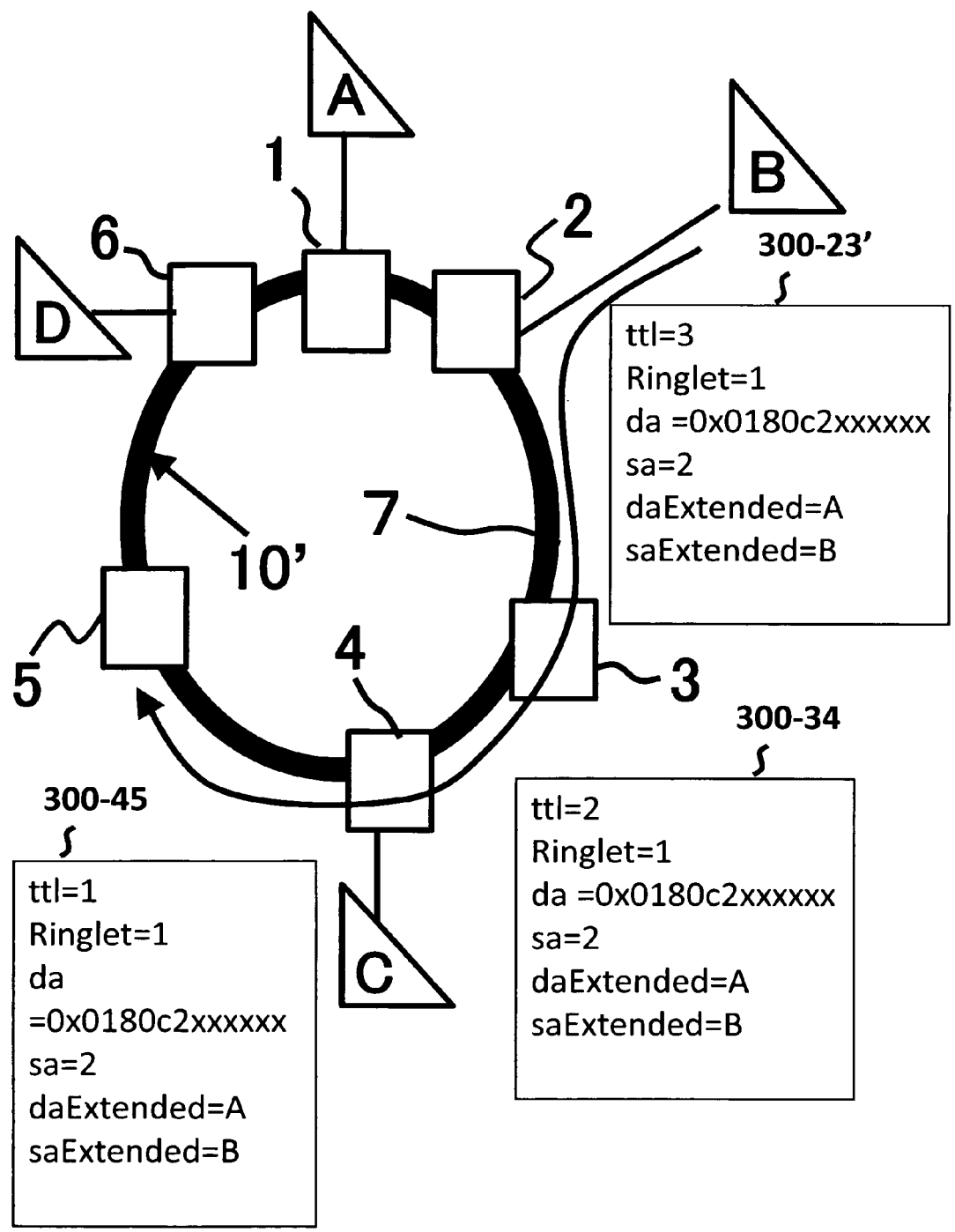
FIG. 18 is a diagram showing a frame flowing on a Ringlet 1.

FIG. 18 shows a case in which a packet from the remote node B is transmitted on the Ringlet 1 in FIG. 16. A frame 300-23 transmitted from the node 2 is received by the node 3. The node 3, which is IEEE 802.17-based, searches the database 605 for the MAC address of the remote node A that is the destination address of the frame 300-23'. Since the IEEE 802.17-based node 3 does not include the remote node route table 206, it cannot learn about the address of the remote node A. Therefore, the node 3 decrements the ttl of the frame 300-23' by one to create a frame 300-34 and then transfers the frame 300-34 to the node 4. The frame 300-34 includes ttl=2, Ringlet=1, da=0x0180C2xxxxxx, sa=2, daExtended=A, and saExtended=B.

The frame 300-34 transferred from the node 3 is received by the node 4. The node 4, which is IEEE 802.17-based, searches the database 605 for the MAC address of the remote node A that is the destination address of the frame 300-34. Since the IEEE 802.17-based node 4 does not include the remote node route table 206, it cannot learn about the address of the remote node A. Therefore, the node 4 decrements the ttl of the frame 300-34 by one to create a frame 300-45 and then transfers the frame 300-45. The frame 300-45 includes ttl=1, Ringlet=1, da=0x0180C2xxxxxx, sa=2, daExtended=A, and saExtended=B.

Then, the node 5 that has received the frame 300-45 detects the ttl value of the frame 300-45 and the ttl value turns out to be 1. Thus, the node 3 recognizes that it is a node serving as the flooding boundary of the ring network. Then, the node 5 strips the frame 300-45. Since the node 5 is IEEE 802.17-based, it does not include the remote node route table 206. Therefore, as with the nodes 3 and 4, the node 5 does not perform learning even if the frame originating from the remote node B is transferred to the node 5.

Figure 19:
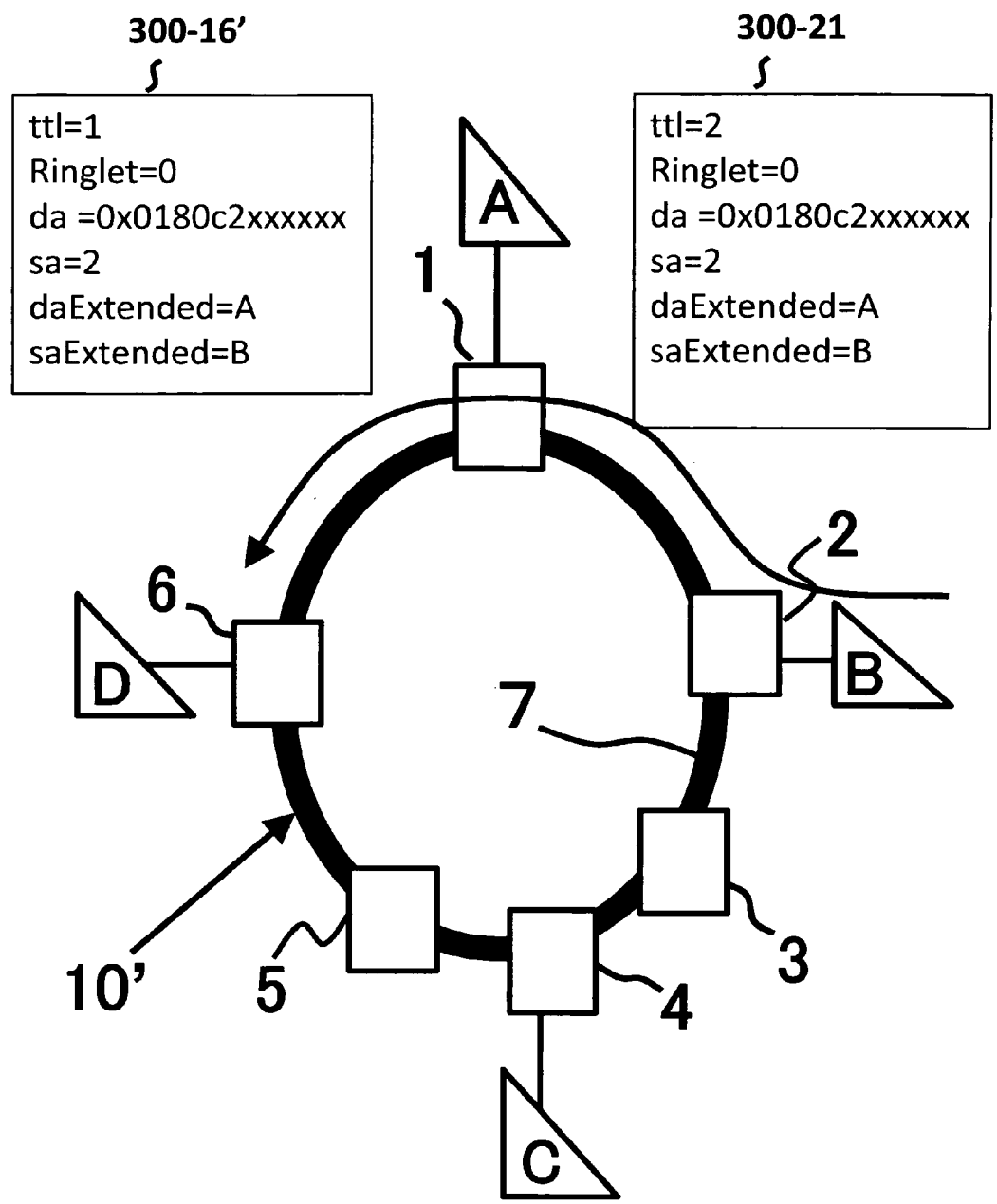
FIG. 19 is a diagram showing a frame flowing on a Ringlet 0.

FIG. 19 shows a case in which a packet is transmitted from the remote node B to the remote node A on the Ringlet 1 in FIG. 16. A frame 300-21 transmitted from the node 2 is received by the node 1. The node 1, which is IEEE 802.17-based, searches the database 605 for the MAC address of the remote node A that is the destination address of the frame 300-21. Since the IEEE 802.17-based node 1 does not include the remote node route table 206, it cannot learn about the address of the remote node A. Therefore, the node 1 decrements the ttl of the frame 300-21 by one to create a frame 300-16' and then transfers the frame 300-16' to the node 6. The frame 300-16' includes ttl=1, Ringlet=0, da=0x0180C2xxxxxx, sa=2, daExtended=A, and saExtended=B.

Figure 20:
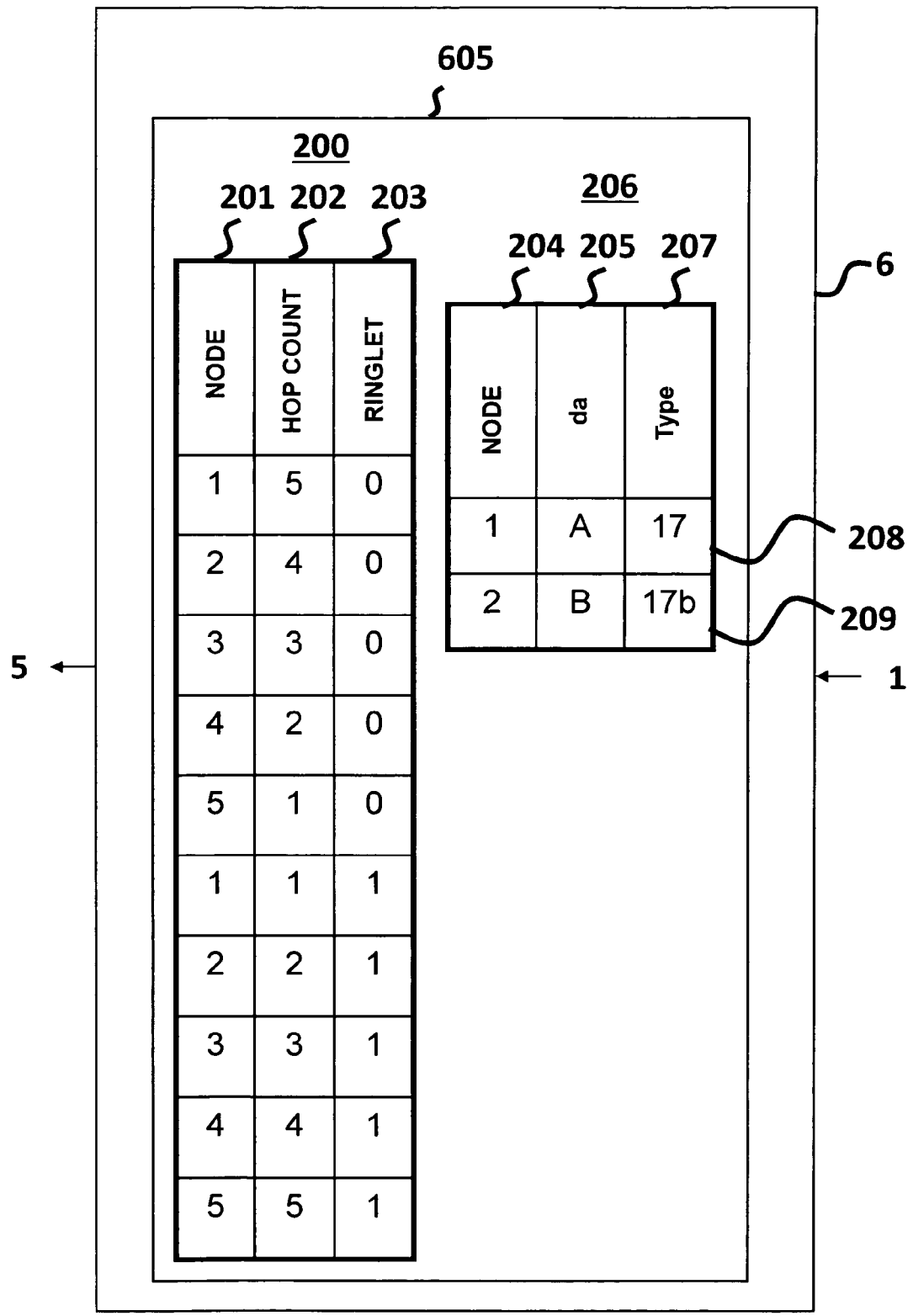
FIG. 20 is a diagram showing a configuration of the database of the node 6.

Then, the node 6, which is IEEE 802.17b-based, receives the frame 300-16', detects the ttl value of the frame 300-16' and the ttl value turns out to be 1. Thus, the node 6 recognizes that it is a node serving as the flooding boundary of the network. Then, the node 6 strips the frame 300-16'. The node 6 has not learned about any remote node since the frame transfer shown in FIG. 12 and, therefore, does not have information on the remote node B. Thus, the node 6 learns about information on the remote node B and the node 2 from the received frame 300-16'. The node 6 extracts, from the packet, information on the MAC address of the remote node B, the MAC address of the node 2, and information on the type of the standard supported by the node 2. Then, the node 6 writes the extraction result into the database 605, as shown in FIG. 20. Specifically, the node 6 adds the row 209 to the remote node route table 206 and writes the MAC address of the node 2 into the column 204 of the row 209, the MAC address of the remote node B into the destination remote node column 205 thereof, and information on IEEE 802.17b, which is the type of the standard supported by the node 2, into the type column 207.

Figure 21:
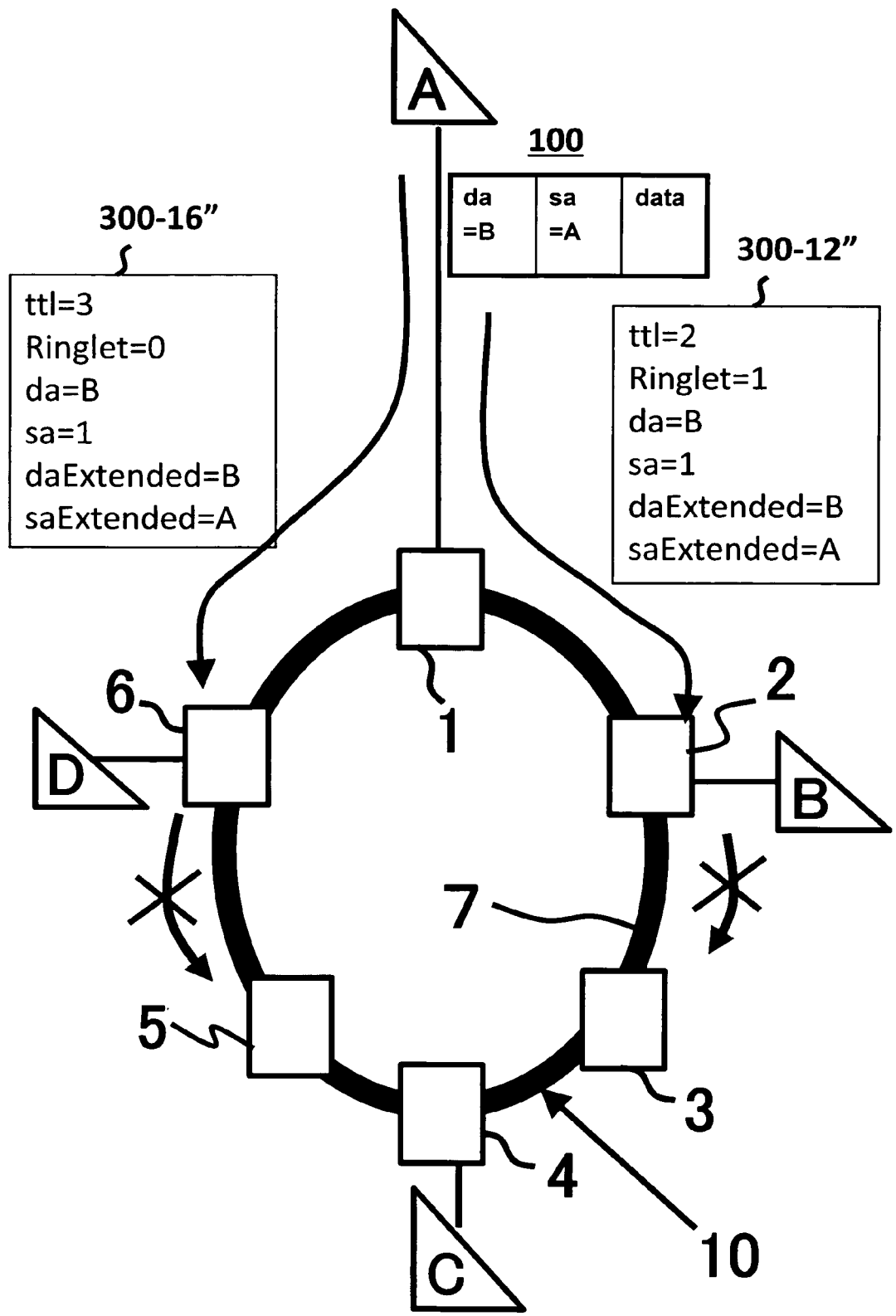
FIG. 21 shows the state in which a packet is being transmitted from the remote node A.

FIG. 21 shows a case in which a packet 100 is transmitted from the remote node A after the frame transmission shown in FIG. 16 has been completed. As in FIG. 11, the network boundary 10 is set up between the nodes 3 and 4.

A frame operation on the Ringlet 0 shown in FIG. 21 will be described below. Upon reception of a frame 300-16'' from the node 1, the node 6 searches the remote node route table 206 of the database 605 for information on the route to the remote node B. As a result, the node 6 recognizes that the remote node B is connected to the node 2. Then, the node 6 searches the network configuration table 200 for the hop count required for reaching the node 2 on the Ringlet 0. As a result, the node 6 recognizes that the hop count is 4. Since the ttl of the received frame is 3, the farthest node that the frame can reach is a node located two hops ahead of the node 6. Therefore, the frame cannot reach the node 2, which is the destination node. Thus, the node 6 strips the frame 300-16''. This prevents any frame corresponding to the frame 300-16'' from being transferred to any node ahead of the node 6.

As for a frame operation on the Ringlet 1 shown in FIG. 21, since the node 2 is destination node, it transfers the frame to the remote node B, thereby stripping the frame from the ring network.

Figure 22:
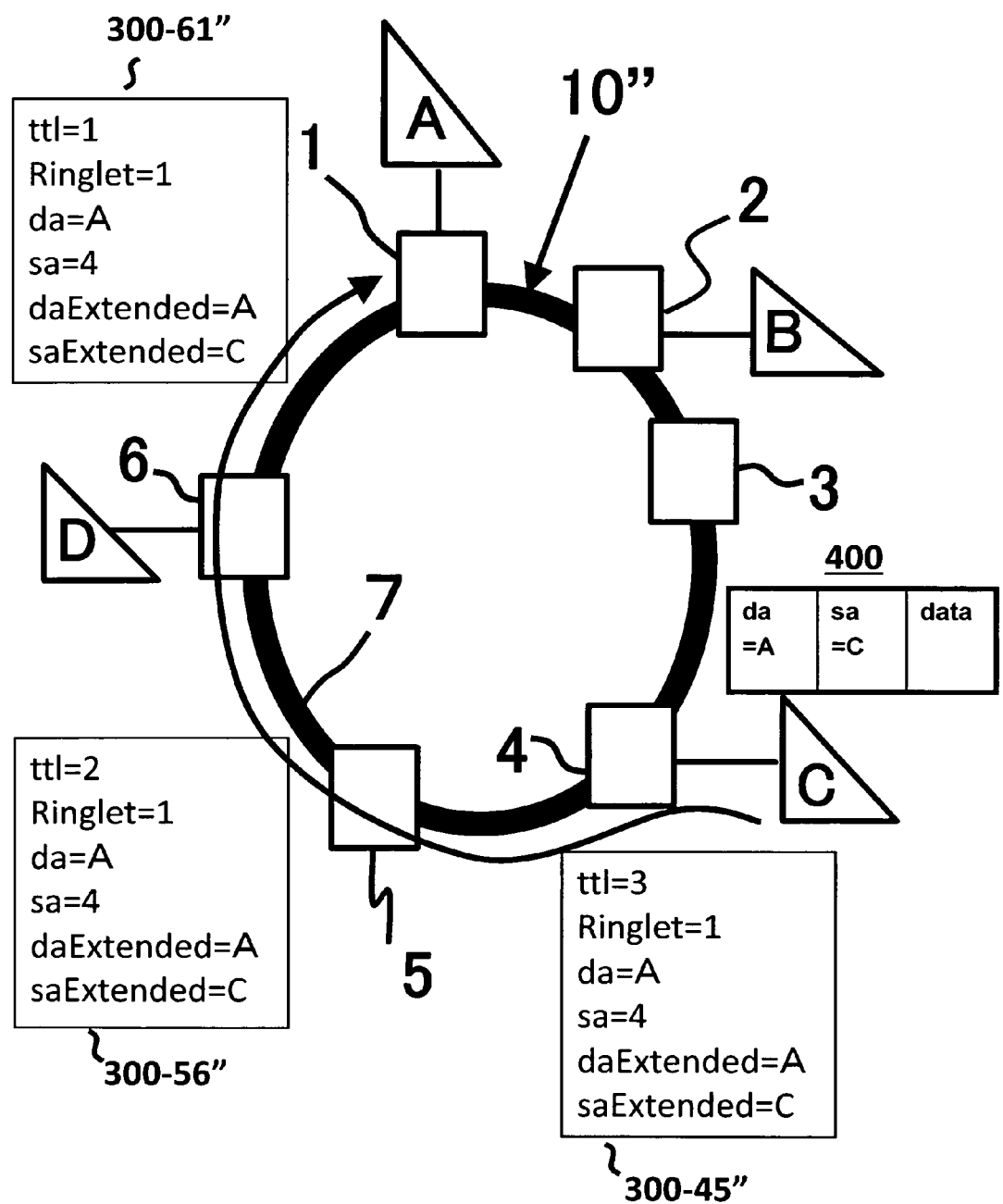
FIG. 22 is a diagram showing a frame flowing on a Ringlet 1.
Figure 23:
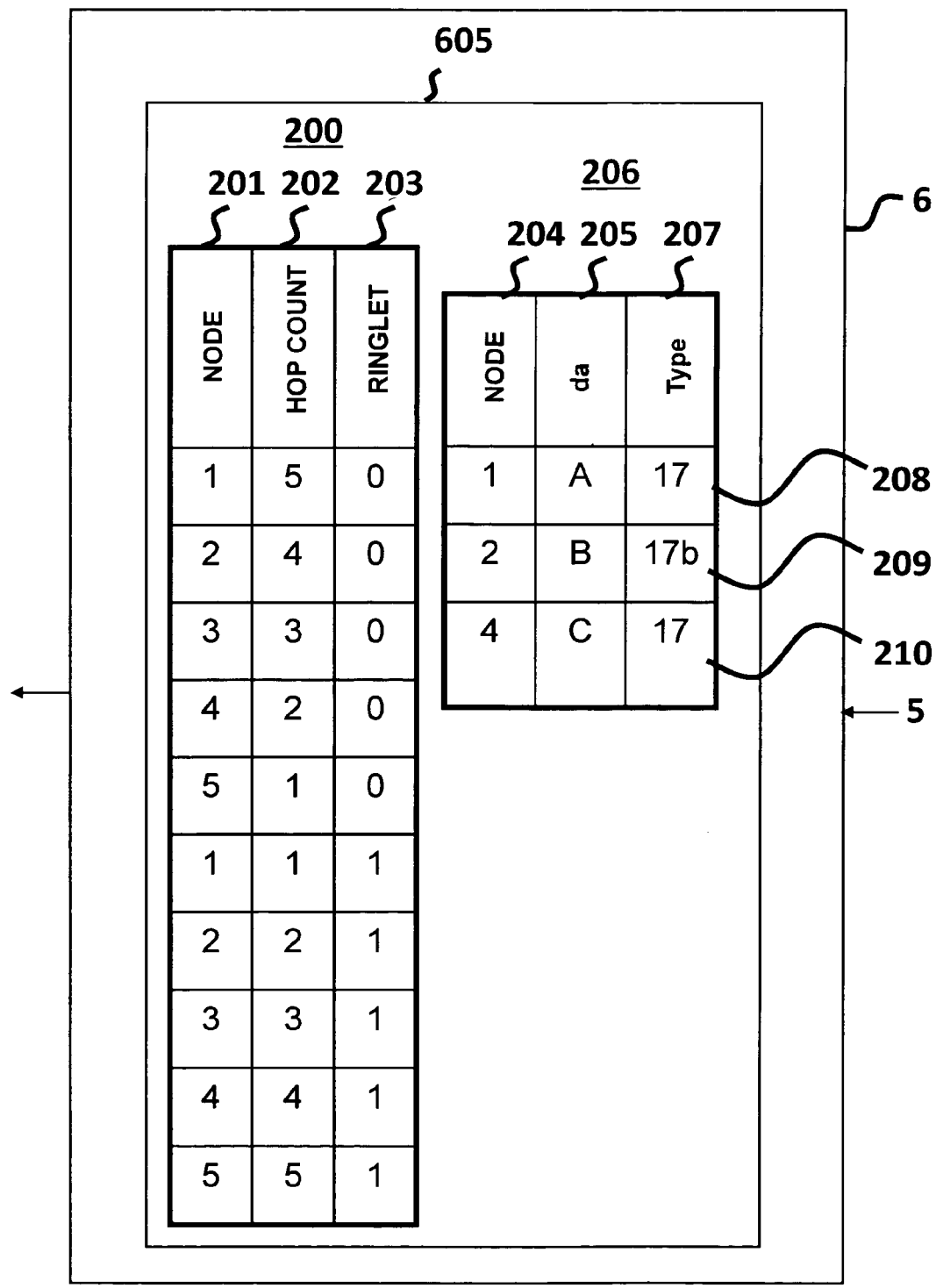
FIG. 23 is a diagram showing a configuration of the database of the node 6.

FIGS. 22 and 23 show a case in which a frame 400 is transferred from the remote node C to the remote node A after the frame transfer shown in FIG. 21 has been completed. The node 4, which IEEE 802.17-based, floods the frame onto both the Ringlet 1 and Ringlet 2. The boundary point for the flooding is set up at a portion 10'' between the nodes 1 and 2.

FIG. 22 shows a transmission operation of an RPR frame on the Ringlet 1. Upon receipt of the packet from the remote node C, the node 4 creates a frame 300-45'' and then transfers the frame 300-45' to the node 5. The frame 300-45'' includes ttl=3, Ringlet=1, da=A, sa=4, daExtended=A, and saExtended=C.

The frame 300-45'' transferred from the node 4 is received by the node 5. The node 5, which is IEEE 802.17-based, searches the database 605 for the MAC address of the remote node A that is the destination address of the frame 300-45''. Since the node 5 is IEEE 802.17-based, it does not include remote node route table 206. Therefore, the node 5 cannot learn about the address of the remote node A. The node 5 decrements the ttl of the frame 300-45'' by one to create a frame 300-56' and then transfers the frame 300-56' to the node 6. The frame 300-56' includes ttl=2, Ringlet=1, da=A, sa=4, daExtended=A, and saExtended=C.

The IEEE 802.17b-based node 6 that has received the frame 300-56' searches the remote node route table 20 of the database 605 for information on the route to the remote node A. As a result, the node 6 recognizes that the remote node A is connected to the node 1. Then, the node 6 searches the network configuration table 200 for the hop count required for reaching the node 1 on the Ringlet 1. As a result, the node 6 recognizes that the hop count is 1. Since the ttl of the received frame is 2, the RPR frame can reach a node located one hop ahead of the node 6, that is, the destination RPR node 1. Therefore, the node 6 transmits the frame 300-61'' to the node 1 located downstream of the node 6. The node 6 also learns about information on the remote node C and the node 4 from the received frame 300-56''. The node 6 adds a row 210 to the remote node route table 206 of the database 605 and writes the MAC address of the node 4 into the column 204 of the row 210, the MAC address of the remote node C into the destination remote node column 205 thereof, and information on IEEE 802.17, which is the type of the standard supported by the node 4, into the type column 207 thereof.

Figure 24:
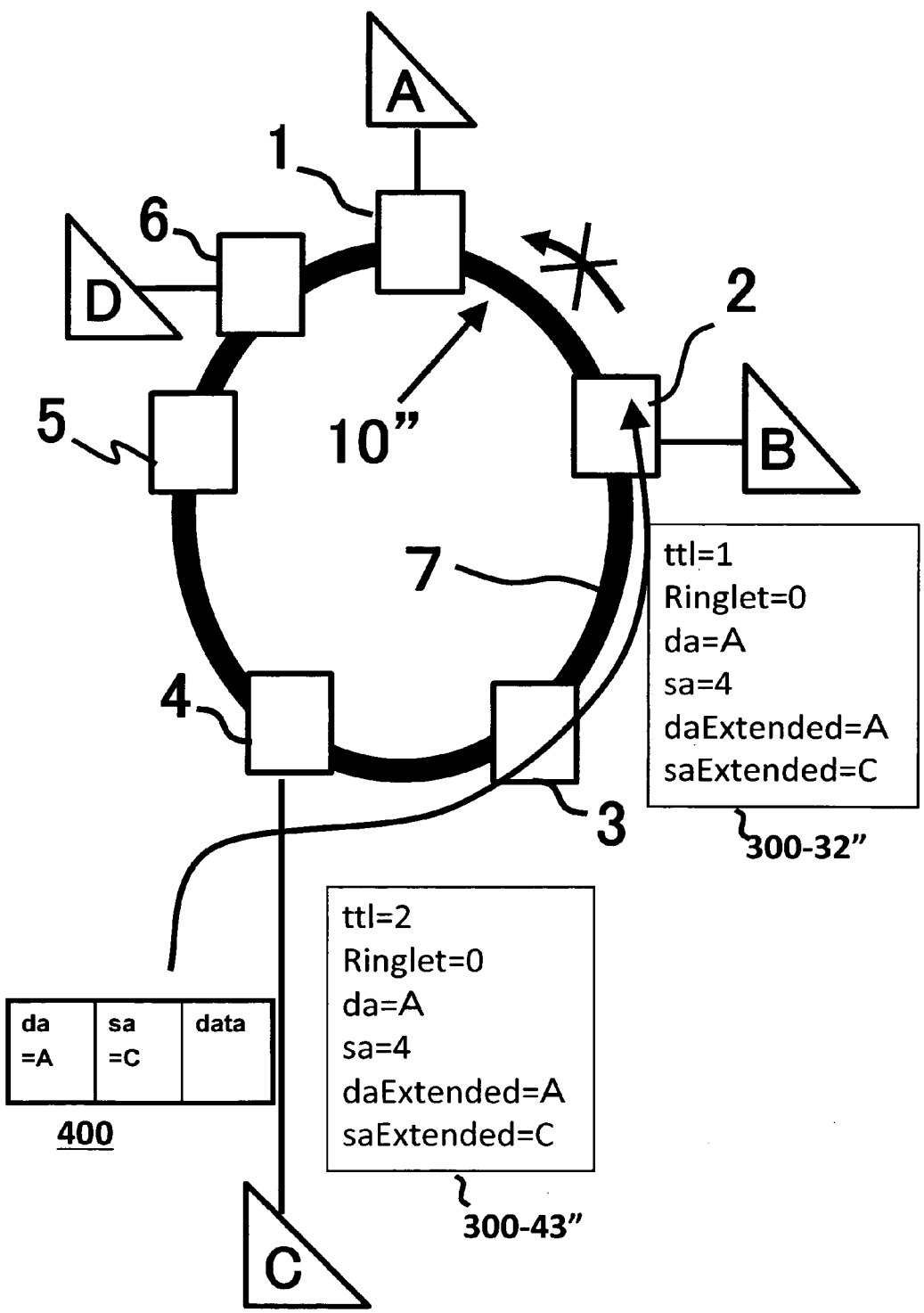
FIG. 24 is a diagram showing a frame flowing on a Ringlet 0.
Figure 25:
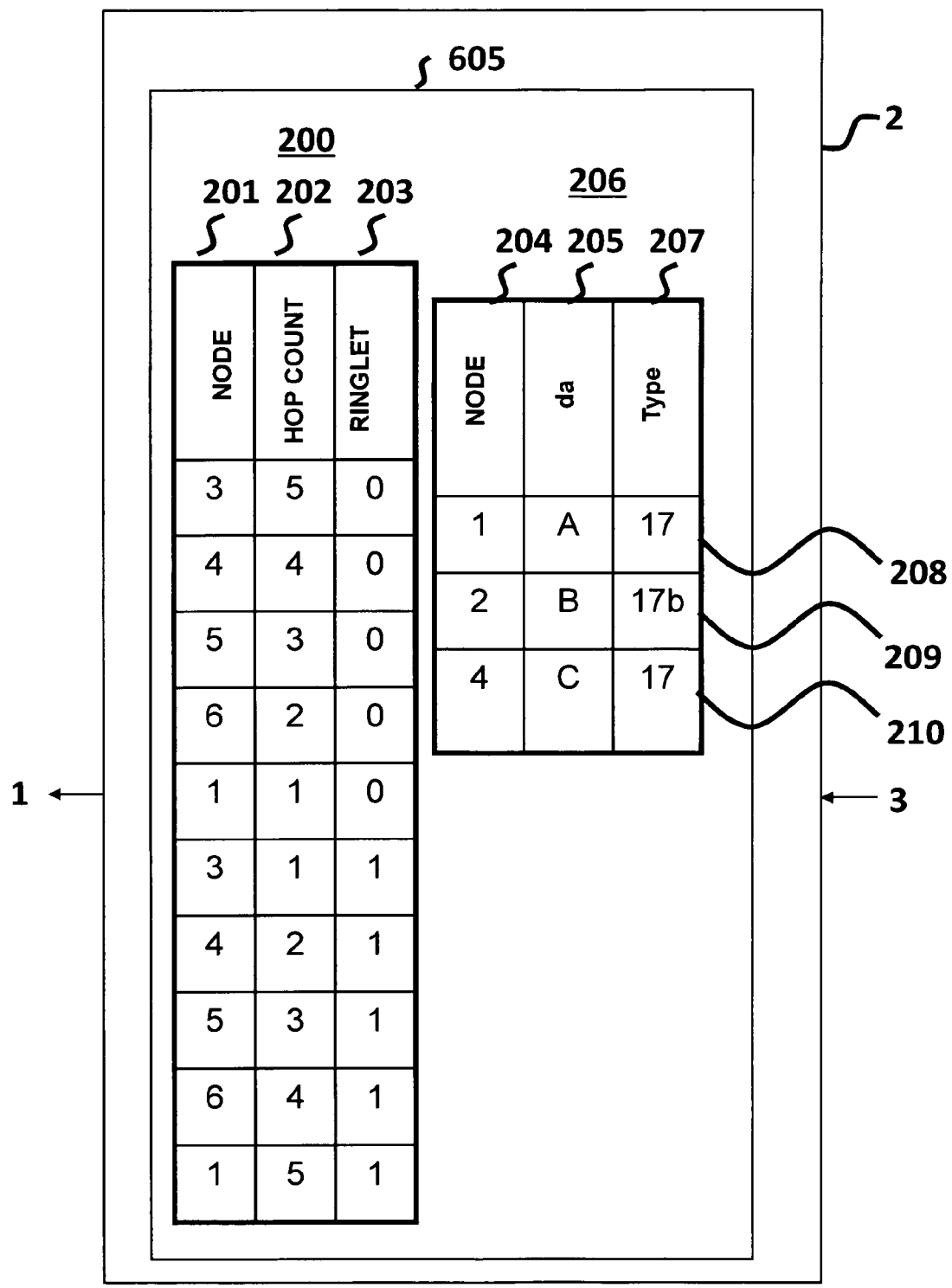
FIG. 25 is a diagram showing a configuration of the database of the node 2.

FIG. 24 shows a transmission operation of a frame on the Ringlet 0. Upon receipt of the packet 400 from the remote node C, the node 4 creates a frame 300-43'' and then transfers the frame 300-43' to the node 3. The frame 300-43'' includes ttl=2, Ringlet=0, da=A, sa=4, daExtended=A, and saExtended=C.

The frame 300-43'' transmitted from the node 4 is received by the node 3. The node 3, which is IEEE 802.17-based, searches the database 605 for the MAC address of the remote node A that is the destination address of the frame 300-43''. Since the IEEE 802.17-based node 1 does not include the remote node route table 206, it cannot learn about the address of the remote node A. Therefore, the node 3 decrements the ttl of the frame 300-43'' by one to create a frame 300-32'' and then transfers the frame 300-32'' to the node 2. The frame 300-32'' includes ttl=1, Ringlet=0, da=A, sa=4, daExtended=A, and saExtended=C.

The IEEE 802.17b-based node 2 that has received the frame 300-32'' checks the ttl of the frame. Since the ttl is 1, the node 2 strips the frame 300-32''. The node 2 also learns about information on the remote node C and the node 4 from the received frame 300-32". The learning is performed by adding the row 210 to the remote node route table 206 of the database 605 and writing the MAC address of the node 4 into the column 204 of the row 210, the MAC address of the remote node C into the remote node column 205 thereof, and information on IEEE 802.17, which is the type of the standard supported by the node 4, into the type column 207 thereof.

The above-mentioned embodiment may be combined as necessary.

According to the above embodiments, if a node detects a frame flowing on a ring network and if the frame is not transferable to its destination address, the node strips the frame. As a result, the frame does not flow downstream of the node for flooding. This enables effective use of the transmission band (spatial reuse) on the ring network.

The invention claimed is:

1. A node arranged on a ring network, for transmitting a frame from upstream to downstream, the ring network having a plurality of nodes connecting a network apparatus, respectively, the node comprising:
   a detector detecting the frame on the ring network; and
   a frame controller controlling the frame, the controller determining whether the frame reaches a final destination based on a comparison of a time-to-live value stored in the frame with a destination hop count stored in a table in the node, the destination hop count indicating a number of hops from the node to a final destination node on the ring network, wherein the time-to-live value indicates the maximum number of times the frame is able to hop on the ring network and is decremented by one each time the frame passes through a node on the ring network, wherein
   the frame controller stops the transmitting for the frame when the time-to-live value stored in the frame is less than the destination hop count.

2. The node of the claim 1, wherein the frame controller learns an address of the network apparatus when the detector detects the frame including, as a source address, the address of the network apparatus, and holds the learned address of the network apparatus in the controller.

3. The node of the claim 2, wherein the frame controller distinguish the other node of the ring net work, using the address of the network apparatus.

4. The node of the claim 2, wherein the frame controller transmits the frame to downstream when the controller does not hold the address of the network apparatus that is equal to a destination address included in the frame.

5. A method for transmitting a frame from upstream to downstream on a ring network, the ring network having a plurality of nodes connecting a network apparatus, respectively, the node comprising:
   detecting the frame on the ring network;
   determining, by a frame controller, whether the frame arrives at a final destination of the frame based on a comparison of a time-to-live value stored in the frame with a destination hop count stored in a table in a node, the destination hop count indicating a number of hops from the node to a final destination node on the ring network, wherein the time-to-live value indicates the maximum number of times the frame is able to hop on the ring network and is decremented by one each time the frame passes through a node on the ring network, and
   stopping, by the frame controller, the transmitting for the frame when the time-to-live value stored in the frame is less than the destination hop count.

\* \* \* \* \*

UNITED STATES PATENT AND TRADEMARK OFFICE
CERTIFICATE OF CORRECTION

| | |
|---|---|
| PATENT NO. | : 7,729,354 B2 |
| APPLICATION NO. | : 12/010880 |
| DATED | : June 1, 2010 |
| INVENTOR(S) | : Masahiro Sato |

It is certified that error appears in the above-identified patent and that said Letters Patent is hereby corrected as shown below:

Column 14, Line 10 delete "net work," and insert --network,--.

Signed and Sealed this

Seventh Day of December, 2010

David J. Kappos
*Director of the United States Patent and Trademark Office*